US012184322B2

(12) United States Patent
Cole et al.

(10) Patent No.: US 12,184,322 B2
(45) Date of Patent: Dec. 31, 2024

(54) CASE WITH MAGNETIC ALIGNMENT FOR PORTABLE ELECTRONIC DEVICE

(71) Applicant: Apple Inc., Cupertino, CA (US)

(72) Inventors: Sean M. Cole, San Jose, CA (US); Nishant R. Jayant, San Francisco, CA (US); Adriano De Fusco, Cupertino, CA (US); James C Wu, Redwood City, CA (US); Aaron A. Oro, Menlo Park, CA (US); Yang Zhou, San Jose, CA (US); Aleksandar Daniel O. Rivin, Sunnyvale, CA (US); Xunsheng Wang, Wuxi (CN); Ross D. Arriens, Campbell, CA (US); Charles W. Werley, San Jose, CA (US); Peter J. Guest, San Jose, CA (US); Alex J. Newman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 677 days.

(21) Appl. No.: 17/461,704

(22) Filed: Aug. 30, 2021

(65) Prior Publication Data
US 2022/0094382 A1 Mar. 24, 2022

Related U.S. Application Data

(60) Provisional application No. 63/081,785, filed on Sep. 22, 2020.

(51) Int. Cl.
*H04B 1/3888* (2015.01)
*H04B 5/26* (2024.01)
*H04M 1/02* (2006.01)

(52) U.S. Cl.
CPC ............. *H04B 1/3888* (2013.01); *H04B 5/26* (2024.01); *H04M 1/0202* (2013.01)

(58) Field of Classification Search
None
See application file for complete search history.

(56) References Cited

U.S. PATENT DOCUMENTS

| 8,688,037 | B2 | 4/2014 | Chatterjee et al. |
| 9,106,083 | B2 | 8/2015 | Partovi |
| 9,627,130 | B2 | 4/2017 | Golko et al. |
| 10,153,666 | B2 | 12/2018 | Lee et al. |
| 10,404,089 | B2 | 9/2019 | Kasar et al. |
| 10,622,842 | B2 | 4/2020 | Lee et al. |
| 10,838,462 | B1 * | 11/2020 | Monaco ................ G06F 1/324 |
| 2012/0146576 | A1 | 6/2012 | Partovi |
| 2018/0248406 | A1 | 8/2018 | Bae et al. |
| 2021/0297836 | A1 * | 9/2021 | Padgett ................ H01Q 19/30 |

FOREIGN PATENT DOCUMENTS

WO WO 2016/053633 4/2016

* cited by examiner

*Primary Examiner* — Frantz Bataille
(74) *Attorney, Agent, or Firm* — BAKERHOSTETLER

(57) ABSTRACT

A magnetic alignment system can include a case with a magnetic alignment component that is configured to align with a magnetic alignment component of a wireless charging device. The case can support a portable electronic device, such as a smart phone and include an NFC coil for communicating with the portable electronic device. The magnetic alignment component and the NFC coil can be provided as an assembly that is embedded within a body of the case in a manner that provides a low profile and improved aesthetic appearance.

19 Claims, 15 Drawing Sheets

CASE WITH MAGNETIC ALIGNMENT FOR PORTABLE ELECTRONIC DEVICE

CROSS-REFERENCE TO RELATED APPLICATIONS

This application claims the benefit of U.S. Provisional Application No. 63/081,785, entitled "CASE WITH MAGNETIC ALIGNMENT FOR PORTABLE ELECTRONIC DEVICE," filed Sep. 22, 2020, the entirety of which is incorporated herein by reference. This application incorporates by reference herein for all purposes U.S. Provisional Application No. 62/907,332, filed Sep. 27, 2019, and U.S. Provisional Application No. 63/061,752, filed Aug. 5, 2020.

TECHNICAL FIELD

The present description relates generally to cases for portable electronic devices, and, more particularly, to cases that provide magnetic alignment for charging portable electronic devices.

BACKGROUND

Portable electronic devices (e.g., mobile phones, media players, electronic watches, and the like) operate when there is charge stored in their batteries. Some portable electronic devices include a rechargeable battery that can be recharged by coupling the portable electronic device to a power source through a physical connection, such as through a charging cord. Using a charging cord to charge a battery in a portable electronic device, however, requires the portable electronic device to be physically tethered to a power outlet. Additionally, using a charging cord requires the mobile device to have a connector, typically a receptacle connector, configured to mate with a connector, typically a plug connector, of the charging cord. The receptacle connector includes a cavity in the portable electronic device that provides an avenue within which dust and moisture can intrude and damage the device. Furthermore, a user of the portable electronic device has to physically connect the charging cable to the receptacle connector in order to charge the battery.

To avoid such shortcomings, wireless charging devices have been developed to wirelessly charge portable electronic devices without the need for a charging cord. For example, some portable electronic devices can be recharged by merely resting the device on a charging surface of a wireless charging device. A transmitter coil disposed below the charging surface may produce a time-varying magnetic flux that induces a current in a corresponding receiving coil in the portable electronic device. The induced current can be used by the portable electronic device to charge its internal battery. Some portable electronic devices have been developed to not only receive wireless power but also provide wireless power to other portable electronic devices, such as accessory devices. Improvements to the way such portable electronic devices receive and transmit wireless power to other devices are needed.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Described herein are various embodiments of magnetic alignment systems and components thereof. A magnetic alignment system can include annular alignment components comprising a ring of magnets having a particular magnetic orientation or pattern of magnetic orientations such that a "primary" annular alignment component can attract and hold a complementary "secondary" annular alignment component. In some embodiments described below, the primary annular alignment component is in a wireless charging device, surrounding an inductive charging coil, while the annular alignment component is in a case for a portable electronic device, which can include a receiver coil that can receive power from the inductive charging coil of the wireless charging device.

In some embodiments, a magnetic alignment system can also include a rotational magnetic alignment component that facilitates aligning two devices in a preferred rotational orientation. It should be understood that any device that has an annular alignment component might or might not also have a rotational magnetic alignment component.

In some embodiments, a magnetic alignment system can also include a near-field communication (NFC) coil and supporting circuitry to allow devices to identify themselves to each other using an NFC protocol. NFC coils can be disposed inboard of the annular alignment component or outboard of the annular alignment component. It should be understood that an NFC component is optional in the context of providing magnetic alignment.

These and other embodiments are discussed below with reference to FIGS. 1-24. However, those skilled in the art will readily appreciate that the detailed description given herein with respect to these Figures is for explanatory purposes only and should not be construed as limiting.

Examples of magnetic alignment systems with multiple (e.g., three) annular alignment components will now be described. It will also be understood that a system where alignment is desired may include more than three devices and that additional auxiliary annular alignment components can be provided to facilitate alignment of more than three devices.

Figure 1:
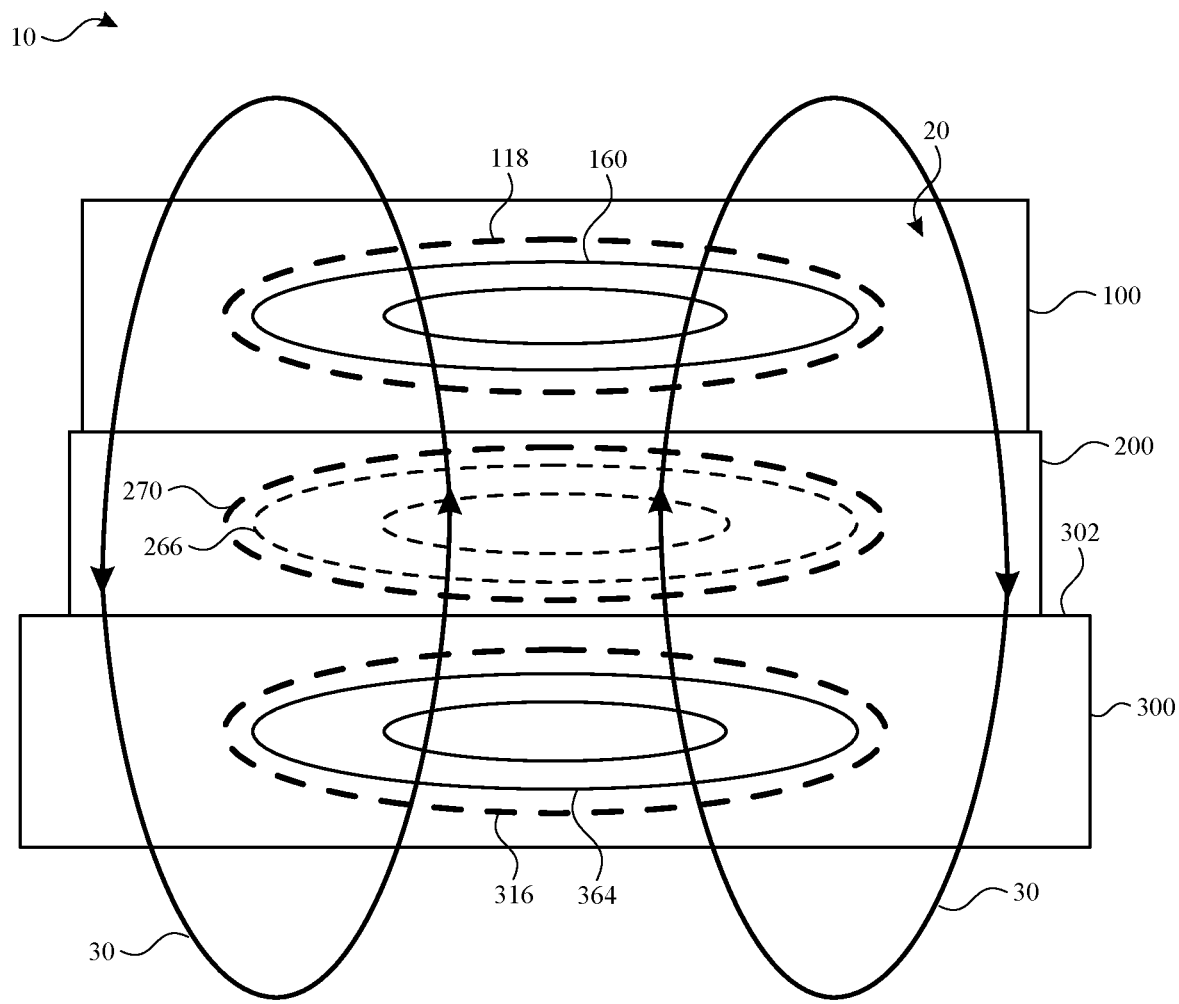
FIG. 1 shows a simplified representation of a wireless charging system incorporating magnetic alignment system according to some embodiments.

FIG. 1 shows a simplified representation of a wireless charging system 10 incorporating a magnetic alignment system 20 according to some embodiments. Wireless charging system 10 includes a portable electronic device 100, a wireless charging device 300, and a case 200 positioned between portable electronic device 100 and wireless charging device 300. Portable electronic device 100 can be a consumer electronic device, such as a smart phone, tablet, wearable device, or the like, or any other electronic device for which wireless charging is desired. Wireless charging device 300 can be any device that is configured to generate time-varying magnetic flux to induce a current in a suitably configured receiving device. For instance, wireless charging device 300 can be a wireless charging mat, puck, docking station, or the like. Wireless charging device 300 can include or have access to a power source such as battery power or standard AC power.

To enable wireless power transfer, portable electronic device 100 and wireless charging device 300 can include inductive coils 110 and 364, respectively, which can operate to transfer power between them. For example, inductive coil 364 can be a transmitter coil that generates a time-varying magnetic flux 30, and inductive coil 110 can be a receiver coil in which an electric current is induced in response to time-varying magnetic flux 30. The received electric current can be used to charge a battery of portable electronic device 100, to provide operating power to a component of portable electronic device 100, and/or for other purposes as desired. In some embodiments, wireless power transfer between wireless charging device 300 and portable electronic device 100 can occur regardless of whether case 200 is present.

Case 200 can be an accessory (or auxiliary device) that is used with portable electronic device 100 to protect, enhance, and/or supplement the aesthetics and/or functions of portable electronic device 100. For example, case 200 can be a protective case, an external battery, a camera attachment, or the like. In some embodiments, case 200 can include one or more wireless charging coils. For example, case 200 can be a portable external battery pack that can be attached to and carried together with portable electronic device 100. In some embodiments, case 200 can operate wireless charging coil 266 as a receiver coil to charge its onboard battery (e.g., from wireless charging device 300) or as a transmitter coil to provide power to portable electronic device 100. In some embodiments, case 200 can include separate transmitter and receiver coils. Case 200 can operate coil(s) to transmit power or to receive and store power depending on current conditions. In still other embodiments, case 200 can be an "unpowered" or "passive" accessory such as a case that contains no active circuitry, and a wireless charging coil can be omitted. In such cases, case 200 can be designed not to inhibit wireless power transfer between wireless charging device 300 and portable electronic device 100. For instance, relevant portions of case 200 can be made of a material such as plastic, leather, or other material that is transparent to time-varying magnetic flux 30.

To enable efficient wireless power transfer, it is desirable to align inductive coils 364 and 160. According to some embodiments, magnetic alignment system 20 can provide such alignment. In the example shown in FIG. 1, magnetic alignment system 20 includes a annular magnetic alignment component 316 disposed within or on a surface of wireless charging device 300, a magnetic alignment component 118 disposed within or on a surface of portable electronic device 100, and a annular magnetic alignment component 270 disposed within or on a surface of case 200. Magnetic alignment components 316, 118, and 270 are configured to magnetically attract one another into an aligned position in which inductive coils 110 and 364 are aligned with one another to effectuate wireless power transfer.

Magnetic alignment system 20 can enable modularity in that various types of cases 200 can align with magnetic alignment components 316 and/or 118, provided that case 200 has annular magnetic alignment component 270. For instance, in some embodiments (e.g., where case 200 is a protective case), case 200 can mechanically couple to portable electronic device 100 in a fixed position such that annular magnetic alignment component 270 is aligned with magnetic alignment component 118, and portable electronic device 100 can rely wholly or partially on annular magnetic alignment component 270 to align with magnetic alignment component 118 of wireless charging device 300. Accordingly, when case 200 is positioned on a surface of the housing 302 of wireless charging device 300 such that annular magnetic alignment component 316 is aligned with annular magnetic alignment component 270, magnetic alignment component 118 of portable electronic device 100 is also aligned with annular magnetic alignment component 270, and efficient wireless power transfer is supported.

As another example, in some embodiments where case 200 is or includes an external battery, annular magnetic alignment component 270 can attract to and align with magnetic alignment component 118 so that power from an internal power source (not shown) within case 200 can be wirelessly transferred to portable electronic device 100 using an inductive coil of the case 200 and inductive coil 110. The modularity of magnetic alignment system 20 can also enable wireless charging device 300 to stack with portable electronic device 100 and case 200. For example, annular magnetic alignment component 270 can attract and align to magnetic alignment component 118 and at the same time can attract and align to annular magnetic alignment component 316. Accordingly, when portable electronic device 100, case 200, and wireless charging device 300 are all stacked together, power can be transmitted wirelessly from wireless charging device 300 to case 200 (e.g., to charge an internal battery of case 200) and from case 200 to portable electronic device 100. Both power transfers can be performed simultaneously; i.e., wireless charging device 300 can provide power to case 200 at the same time that case 200 provides power to portable electronic device 100. In some embodiments, to enable simultaneous power transfers, case 200 can include two inductive coils, one for receiving power and one for transmitting power. In other embodiments, the power transfers can be performed sequentially; e.g., wireless charging device 300 can provide power to wireless charging device 300, and at a time when wireless charging device 300 is not providing power, wireless charging device 300 can provide power to portable electronic device 100.

While FIG. 1 shows three devices stacked together, it should be understood that the same principles can be applied to form systems of four or more devices. For instance, a wireless charging system can include a portable electronic device coupled to a protective case that is attached to and magnetically aligned with an external battery, which is attached to and magnetically aligned to a wireless charging device. All the inductive coils within the respective devices can be aligned together, and wireless power can be transmitted between the wireless charging device and the external battery, between the battery and the portable electronic device, and/or between the wireless charging device and the portable electronic device. It is to be appreciated that any number of devices can be stacked together without departing from the spirit and scope of the present disclosure.

According to embodiments described herein, an alignment component (including a primary, secondary, or auxiliary alignment component) of a magnetic alignment system can be formed of arcuate magnets arranged in an annular configuration. In some embodiments, each magnet can have its magnetic polarity oriented in a desired direction so that magnetic attraction between the primary, secondary, and auxiliary alignment components provides a desired alignment. In some embodiments, an arcuate magnet can include a first magnetic region with magnetic polarity oriented in a first direction and a second magnetic region with magnetic polarity oriented in a second direction different from the first direction. As will be described, different configurations can provide different degrees of magnetic field leakage.

Figures 2, 3:
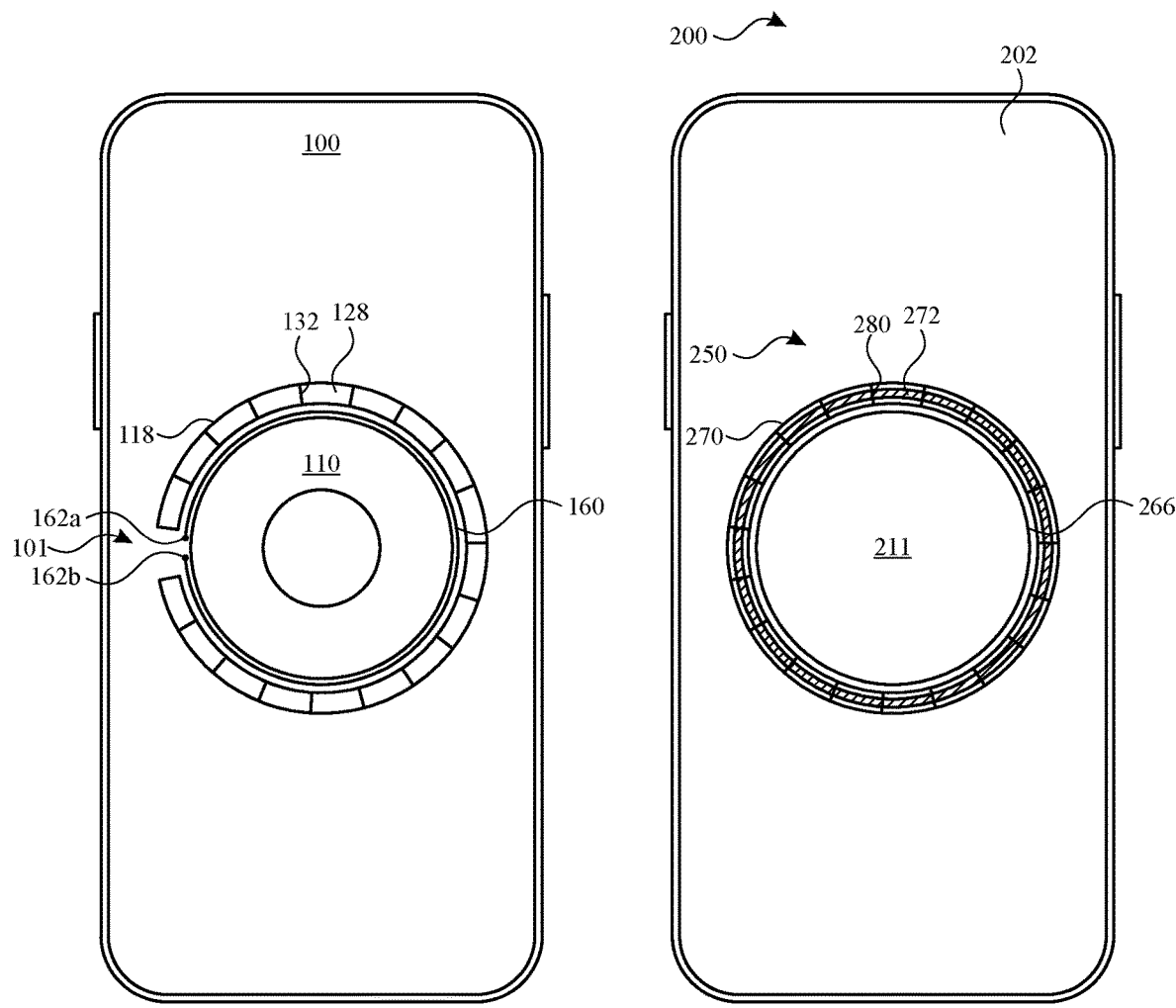
FIG. 2 shows a smart phone as an example of a portable electronic device that can incorporate a magnetic alignment component according to some embodiments.
FIG. 3 shows a simplified rear view of a case incorporating a magnetic alignment component according to some embodiments.

FIG. 2 shows a simplified rear view of a portable electronic device incorporating magnetic alignment components according to some embodiments. In the examples shown, the portable electronic device incorporates secondary magnetic alignment components, which can allow for a thinner device profile; however, it should be understood that a portable electronic device can instead incorporate a primary magnetic alignment component.

FIG. 2 shows a smart phone as an example of a portable electronic device 100 that can incorporate a magnetic alignment component according to some embodiments. Portable electronic device 100 can support a variety of computing and communication activities and may draw operating power from an onboard battery (not shown). In some embodiments, the battery can be recharged using wireless power transfer. For example, portable electronic device 100 can include a coil 110, which can be configured as a receiver coil that generates current in response to time-varying magnetic fields for wireless power transfer. Such time-varying magnetic fields can be provided by a transmitter coil in a wireless charging device (not shown in FIG. 2). In addition or instead, coil 110 may be operable as a transmitter coil for wireless power transfer and may be operable to generate time-varying magnetic fields that can be used to charge an accessory device such as a case for wireless headphones, an external battery, or another portable electronic device (e.g., another smart phone). Coil 110 can include a receiver coil (e.g., a wound coil of electrically conductive wire) coupled to a power storage device (e.g., a battery) or power consuming device. In some embodiments, coil 110 can also include electromagnetic shielding (e.g., one or more pieces of ferrite) placed over the distal surface, inner annular surface, and/or outer annular surface of the coil.

For optimal wireless charging performance, it is desirable to align coil 110 with a coil in the transmitting (or receiving) device. Magnetic alignment component 118 can be for example, an implementation of any of the secondary magnetic alignment components described above and can include an annular arrangement of magnets 128 with interfaces 132, which can be air gaps or interfaces where adjacent magnets contact one another. The magnetic polarities of magnets 128 can be oriented in varying directions in the lateral plane, e.g., in a radial direction. In the example shown, magnetic alignment component 118 includes a gap 101, which can provide electrical connection paths for wires (or conductive traces) to connect between coil 110 and components outside the perimeter of magnetic alignment component 118.

Coil 110 can be optimized to support wireless power transfer between devices. In some embodiments, it may also be desirable to support wireless data transfer between devices, for instance to allow different devices that incorporate magnetic alignment systems to identify themselves. Accordingly, in some embodiments, a near-field communication (NFC) coil 160 can be provided in the region between coil 110 and magnets 128. An NFC reader circuit and/or other components (not shown) can connect to termination ends 162a, 162b of NFC coil 160 through gap 101.

FIG. 3 shows a simplified rear view of a case 200 incorporating a magnetic alignment component according to some embodiments. In the example shown, the accessory device incorporates an auxiliary alignment component; however, it should be understood that an accessory device can instead incorporate a primary or secondary magnetic alignment component.

Case 200 can be, for example, a protective or aesthetic case for a portable electronic device 100 such as a smart phone described above. Accordingly, case 200 can have a body 202, which can be the same size as (or slightly larger than) portable electronic device 100. In some embodiments, body 202 can be shaped as a tray that covers the side and rear surfaces of portable electronic device 100, leaving the front (display) surface of portable electronic device 100 exposed. An annular magnetic alignment component 270 of an annular assembly 250 can be disposed within body 202, in a position such that, when portable electronic device 100 is inserted into case 200 in the preferred orientation, annular magnetic alignment component 270 is coaxially aligned with magnetic alignment component 118 of portable electronic device 100.

Annular magnetic alignment component 270 can be, for example, an implementation of any of the auxiliary alignment components described above and can include an annular arrangement of magnets 272 with interfaces 280, which can be air gaps or interfaces where adjacent magnets contact one another. Any number of magnets 272 can be provided with one or more of the same, similar, or different characteristics. Magnets 272 can have a quad-pole configuration as described above; for instance, each magnet 272 can include an inner arcuate region having an axial magnetic orientation in a first direction, an outer arcuate region having an axial magnetic orientation in a second direction opposite the first direction, and a central arcuate region having no distinct magnetic orientation. Although not shown in FIG. 3, annular magnetic alignment component 270 can include one or more gaps between adjacent magnets 272. In some embodiments, the gap(s) can provide electrical connection paths for wires (or conductive traces) to connect between regions interior and exterior to annular magnetic alignment component 270, and in some embodiments, the gap(s) can be arranged to allow body 202 to have a reduced lateral size for use with a smart phone having a smaller form factor.

The magnet 272 and/or other magnets described herein can include a temporary magnet of a soft magnetic material or a permanent magnet of a hard magnetic material. As used herein, "magnet" can include a magnet of a hard magnetic material and/or a magnet of a soft magnetic material. Hard magnetic materials include materials that retain their magnetism even after the removal of an applied magnetic field. Magnets that include hard magnetic material can form permanent magnets. Hard magnetic materials include neodymium (NdFeB), iron-neodymium, iron-boron, cobalt-samarium, iron-chromium-cobalt, and combinations or alloys thereof. Soft magnetic materials include materials that are responsive to magnetic fields, but do not retain their magnetism after removal of an applied magnetic field. Magnets that include soft magnetic material can form temporary magnets. Soft magnetic materials include iron, iron-cobalt, iron-silicon, steel, stainless steel, iron-aluminum-silicon, nickel-iron, ferrites, and combinations or alloys thereof. It will be recognized that "hard magnetic" and "soft magnetic" does not necessarily relate to the rigidity of the materials.

In some embodiments, it may be desirable to support wireless data transfer between case 200 and portable electronic device 100, for instance to allow case 200 to identify itself to portable electronic device 100. Accordingly, in some embodiments, a near-field communication (NFC) coil 266 can be provided in the region interior to annular magnetic alignment component 270. In some embodiments, NFC coil 266 can couple to a passive NFC tag that can be read by a suitably configured NFC reader (e.g., in portable electronic device 100 of FIG. 2).

In the example shown, case 200 is a passive device whose function may be protective and/or aesthetic. As such, it may be desirable to make case 200 thin and to provide smooth inner and outer surfaces. In some embodiments, magnets 272 can have a thin axial dimension so that case 200 can have smooth surfaces and a desired thinness. Case 200 can have a variety of shapes and features. For example, case 200 can be a tray that covers the side and rear surfaces of portable electronic device 100, leaving the front (display) surface of portable electronic device 100 exposed. Alternatively, case 200 can include a cover that can be folded over the front surface of portable electronic device 100 and unfolded to allow access to the display. As another example, case 200 can be formed as a sleeve having an opening at one end (e.g., the top end or a side) to allow portable electronic device 100 to be inserted into the sleeve when not in use and removed from the sleeve for use. As yet another example, case 200 can be formed as a "wallet" having a slot that extends laterally across the back surface, forming a pocket into which an ID card, credit card, or the like can be inserted. In this instance, annular magnetic alignment component 270 can be disposed at the rear side of the pocket.

In the example shown, case 200 can be a passive device that does not contain power-consuming components. Accordingly, the region 211 interior to annular magnetic alignment component 270 can be made of the same material as the surrounding body 202, providing a continuous back surface for case 200. Alternatively, part or all of region 211 may be devoid of material, allowing the corresponding portion of the rear surface of portable electronic device 100 to be exposed. In some embodiments, body 202 of case 200 (or portions thereof) can be made of transparent material so that the rear surface of portable electronic device 100 can be seen through case 200. In the absence of transparent magnetic material, an annular region of opaque material can be disposed over annular magnetic alignment component 270 so that the individual magnets are not visible. The opaque material can have a color (or colors) selected for a desired aesthetic effect.

In some embodiments, case 200 can be an active device. For example, case 200 can include an external battery that can provide power to portable electronic device 100. Accordingly, central region 211 can include one or more wireless charging coils, which can be arranged and operated as described above with reference to case 200 of FIG. 1.

Figure 4:
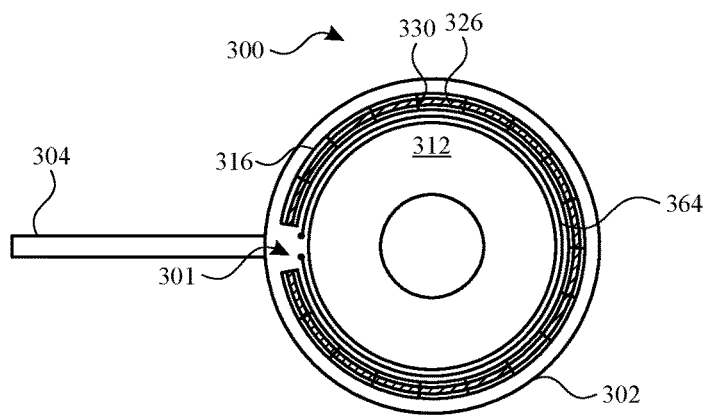
FIG. 4 shows a simplified view of a wireless charging device incorporating a magnetic alignment component according to some embodiments.

FIG. 4 shows a simplified view of a wireless charging device 300 incorporating a magnetic alignment component according to some embodiments. In the example shown, the wireless charging device incorporates a primary alignment component; however, it should be understood that a wireless charging device can instead incorporate a secondary magnetic alignment component.

Wireless charging device 300 can support inductive power transfer for charging a portable electronic device (such as portable electronic device 100 of FIG. 2). In this example, wireless charging device 300 has a puck-shaped housing 302 surrounding a transmitter coil assembly 312. Although not shown in FIG. 4, it should be understood that transmitter coil assembly 312 can include a transmitter coil having wires that can be connected to an external power source (e.g., via cable 304) and control circuitry to control operation of the transmitter coil. In some embodiments, transmitter coil assembly 312 can also include electromagnetic shielding (e.g., one or more pieces of ferrite placed over the distal surface, inner annular surface, and/or outer annular surface of the transmitter coil and/or a thin layer of metal placed over the proximal surface of the transmitter coil to reduce parasitic electric fields). An annular magnetic alignment component 316, which can include any of the embodiments described above, is disposed around the outside of transmitter coil assembly 312.

Components of wireless charging device 300 can be enclosed in a housing 302, which can be made of aluminum, plastic, ceramic, or other durable material. In some embodiments, housing 302 can be a two-piece housing that includes an enclosure for the distal and side surfaces of wireless charging device 300 and a top cap covering the proximal surface of transmitter coil assembly 312. The top cap (not shown in FIG. 4) can be made of ceramic or other material that is permeable to electromagnetic fields, while the enclosure can be made of aluminum or other plastic. The top cap and enclosure can be sealed together using an appropriate adhesive. Although FIG. 4 shows a view into the interior of wireless charging device 300, it should be understood that housing 302 can be opaque. Housing 302 can include an opening to permit connection of cable 304 to transmitter coil assembly 312. In some embodiments, one end of cable 304 is captively coupled to electronic components of transmitter coil assembly 312 while the other end of cable 304 (not shown) is coupled to a plug connector (e.g., a USB type A or USB-C connector) that can be used to draw power from the grid or other power source via an adapter.

For optimal wireless charging performance, it is desirable to align the transmitter coil of coil assembly 312 with a corresponding coil in a receiving device such as portable electronic device 100. Annular magnetic alignment component 316 can be, for example, an implementation of any of the primary magnetic alignment components described above and can include an annular arrangement of magnets 326 with interfaces 330 between adjacent magnets 326, which can be air gaps or interfaces where adjacent magnets 326 contact one another. Magnets 326 can provide a closed loop configuration as described above; for instance, each magnet 326 can include an inner arcuate region having an axial magnetic orientation in a first direction, an outer arcuate region having an axial magnetic orientation in a second direction opposite the first direction, and a central arcuate region having no distinct magnetic orientation. Any number of magnets 326 can be provided with one or more of the same, similar, or different characteristics. In the example shown, annular magnetic alignment component 316 includes a gap 301, which can provide electrical connection paths for wires (or conductive traces) to connect between coil assembly 312 and cable 304 without adding to the axial height of wireless charging device 300.

Coil assembly 312 can be optimized to support wireless power transfer between devices. In some embodiments, it may also be desirable to support wireless data transfer between devices, for instance to allow different devices that incorporate magnetic alignment systems to identify themselves. Accordingly, in some embodiments, a near-field communication (NFC) coil can be provided in the region between coil assembly 312 and annular magnetic alignment component 316. In some embodiments, an NFC coil can couple to a passive NFC tag that can be read by a suitably configured NFC reader (e.g., in portable electronic device 100 of FIG. 2 and/or case 200 of FIG. 3).

In various embodiments, annular magnetic alignment component 316 can be used to facilitate alignment between wireless charging device 300 and a variety of different portable electronic devices having different form factors. As long as the portable electronic device being aligned with annular magnetic alignment component 316 includes a complementary secondary alignment component having an annular shape matching annular magnetic alignment component 316 and a magnetic field orientation complementary to annular magnetic alignment component 316, annular magnetic alignment component 316 can facilitate alignment of wireless charging device 300 with the portable electronic device, regardless of any other dimensions of either device. It should also be understood that some embodiments of wireless charging device 300 can be used to charge a portable electronic device that does not have a magnetic alignment component; however, in such instances, annular magnetic alignment component 316 might not facilitate optimal alignment with the portable electronic device, and the user would need to align the devices using other techniques (e.g., manual adjustment based on charging performance or placing the devices in a cradle that holds the devices such that their respective charging coils are in alignment).

Figure 5:
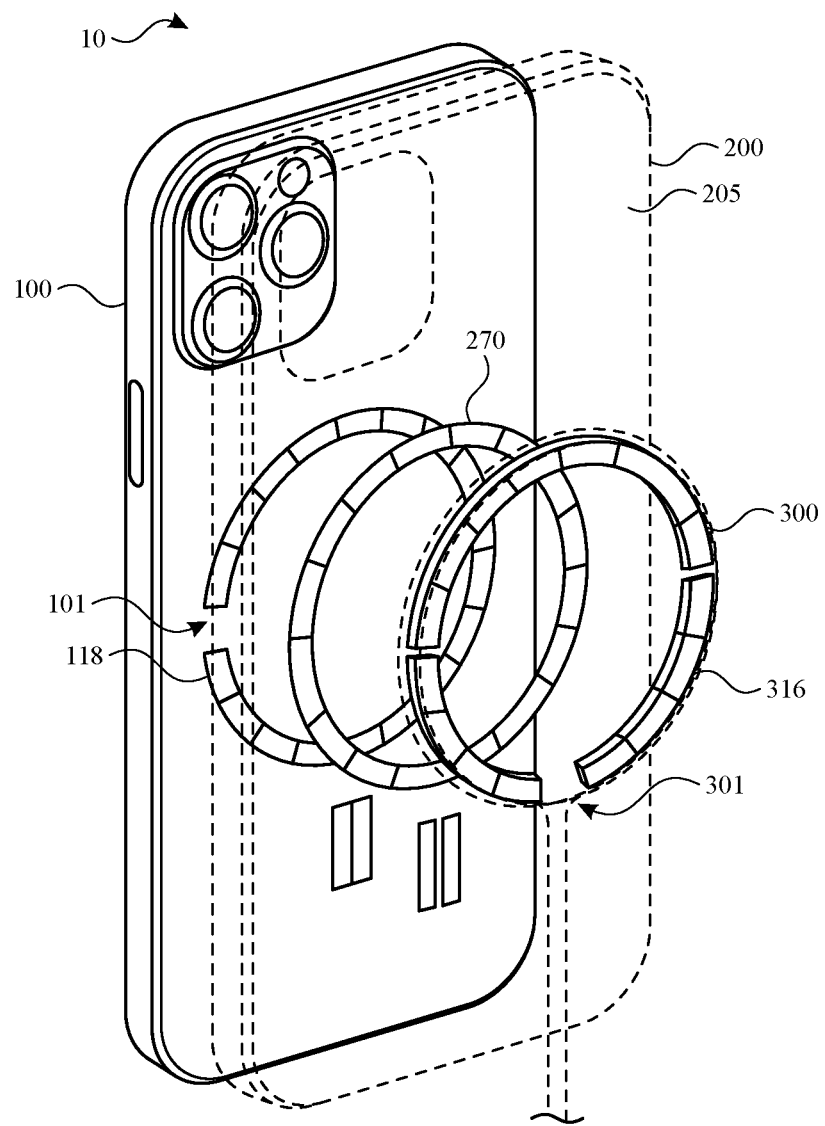
FIG. 5 shows a simplified perspective view of a system including a portable electronic device in alignment with a case and a wireless charging device according to some embodiments.

FIG. 5 shows a simplified perspective view of a wireless charging system 10 including portable electronic device 100 (of FIG. 2) in alignment with case 200 (of FIG. 3) and wireless charging device 300 (of FIG. 4) according to some embodiments. In FIG. 5, portions of wireless charging device 300 and case 200 are shown using dashed lines to avoid obscuring other details. As shown, case 200 can be placed adjacent to portable electronic device 100, for example by inserting portable electronic device 100 into case 200, and wireless charging device 300 can be placed with its charging (or proximal) surface against the rear (or proximal) surface 205 of case 200. When the devices are placed in this arrangement, magnetic alignment component 118 in portable electronic device 100 is aligned with annular magnetic alignment component 270 of case 200 and with annular magnetic alignment component 316 of wireless charging device 300. Accordingly, annular magnetic alignment component 270 in case 200 and magnetic alignment component 118 in portable electronic device 120 can attract and hold annular magnetic alignment component 316 of wireless charging device 300 in alignment so that transmitter coil assembly 312 of wireless charging device 300 is aligned with coil 110 of portable electronic device 100. As shown, wireless charging device 300 can have any rotational orientation about an axis defined by the centers of annular magnetic alignment component 316 and secondary magnetic alignment component 118; for instance, gap 101 in secondary magnetic alignment component 118 need not align with gap 301 in annular magnetic alignment component 316.

In various embodiments described above, a magnetic alignment system can provide robust alignment in a lateral plane and may or may not provide rotational alignment. For example, radially symmetric magnetic alignment system may not define a preferred rotational orientation. A radially alternating magnetic alignment system can define multiple equally preferred rotational orientations. For some applications, such as alignment of a portable electronic device and case with a wireless charging puck, rotational orientation may not be a concern. In other applications, such as alignment of a portable electronic device in a docking station or upright holder, a particular rotational alignment may be desirable. Accordingly, in some embodiments an annular magnetic alignment system can be augmented with one or more rotational magnetic alignment components that can be positioned externally to and spaced apart from the annular magnetic alignment components to help guide devices into a target rotational orientation relative to each other.

Figure 6:
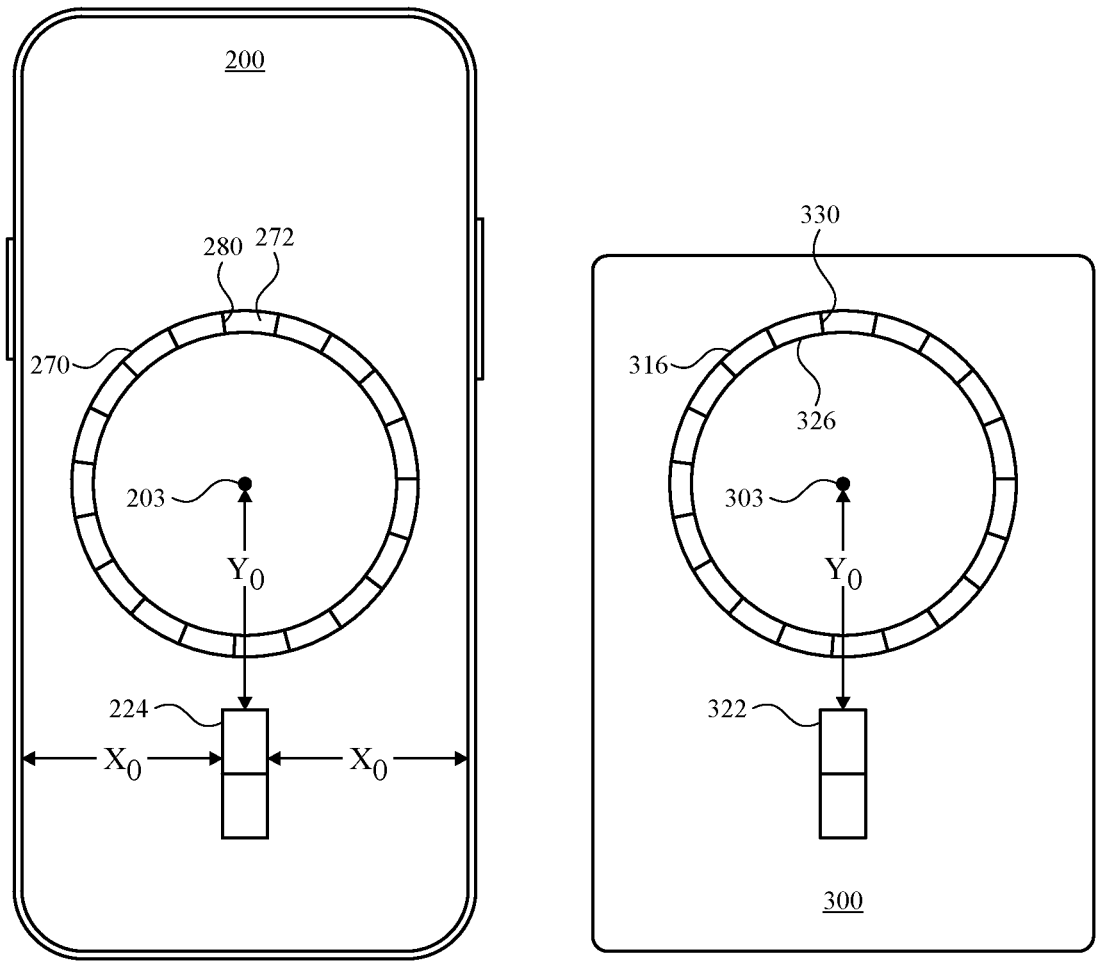
FIG. 6 shows an example of a magnetic alignment system with an annular alignment component and a rotational magnetic alignment component according to some embodiments.

FIG. 6 shows an example of a magnetic alignment system with an annular alignment component and a rotational magnetic alignment component according to some embodiments. In this example, primary alignment components of the magnetic alignment system are included in a wireless charging device 300, and secondary alignment components of the magnetic alignment system are included in a case 200.

As described above, components of a magnetic alignment system can include a annular magnetic alignment component 316 disposed in wireless charging device 300 and a annular magnetic alignment component 270 disposed in portable electronic device. Annular magnetic alignment component 316 can be similar or identical to any of the primary alignment components described above. For example, annular magnetic alignment component 316 can be formed of arcuate magnets 326 arranged in an annular configuration. Although not shown in FIG. 6, one or more gaps can be provided in annular magnetic alignment component 316, e.g., by omitting one or more of arcuate magnets 326 or by providing a gap at one or more interfaces 330 between adjacent arcuate magnets 326. In some embodiments, each arcuate magnet 326 can include an inner region having a first magnetic orientation (e.g., axially oriented in a first direction) and an outer region having a second magnetic orientation opposite the first magnetic orientation (e.g., axially oriented opposite the first direction), with a non-magnetized gap region between the inner and outer regions (which can include an air gap or a nonmagnetic material). In some embodiments, primary annular alignment component can also include a shield (not shown) on the distal side of arcuate magnets 326.

Likewise, annular magnetic alignment component 270 can be similar or identical to any of the secondary alignment components described above. For example, annular magnetic alignment component 270 can be formed of arcuate magnets 272 arranged in an annular configuration. Although not shown in FIG. 6, one or more gaps can be provided in annular magnetic alignment component 270, e.g., by omitting one or more arcuate magnets 272 or by providing a gap at one or more interfaces 280 between adjacent magnets 272. As described above, arcuate magnets 272 can provide radially-oriented magnetic polarities. For instance, all sectors of annular magnetic alignment component 270 can have a radially-outward magnetic orientation or a radially-inward magnetic orientation, or some sectors of annular magnetic alignment component 270 may have a radially-outward magnetic orientation while other sectors of annular magnetic alignment component 270 have a radially-inward magnetic orientation.

As described above, annular magnetic alignment component 316 and annular magnetic alignment component 270 can provide shear forces that promote alignment in the lateral plane so that center point 303 of annular magnetic alignment component 316 aligns with center point 203 of annular magnetic alignment component 270. However, annular magnetic alignment component 316 and annular magnetic alignment component 270 might not provide shear forces that favor any particular rotational orientation, such as portrait orientation.

Accordingly, in some embodiments, a magnetic alignment system can incorporate one or more rotational magnetic alignment components in addition to the annular alignment components. The rotational magnetic alignment components can include one or more magnets that provide torque about the common axis of the (aligned) annular alignment components, so that a preferred rotational orientation can be reliably established. For example, as shown in FIG. 6, a rotational magnetic alignment component 322 can be disposed outside of and spaced apart from annular magnetic alignment component 316 while a rotational magnetic alignment component 224 is disposed outside of and spaced apart from annular magnetic alignment component 270. Rotational magnetic alignment component 224 can be positioned at a fixed distance ($y_0$) from center point 203 of annular magnetic alignment component 270 and centered between the side edges of case 200 (as indicated by distance xo from either side edge). Similarly, rotational magnetic alignment component 322 can be positioned at the same distance $y_0$ from center point 303 of annular magnetic alignment component 316 and located at a rotational angle that results in a torque profile that favors the desired orientation of case 200 relative to wireless charging device 300 when rotational magnetic alignment component 224 is aligned with rotational magnetic alignment component 322. It should be noted that the same distance $y_0$ can be applied in a variety of cases having different form factors, so that a single accessory can be compatible with a family of cases.

According to some embodiments, each of rotational magnetic alignment component 322 and rotational magnetic alignment component 224 can be implemented using one or more rectangular or square blocks of magnetic material each of which has each been magnetized such that its magnetic polarity is oriented in a desired direction. The magnetic orientations of rotational magnetic alignment components 322 and 224 can be complementary so that an attractive magnetic force is generated when the proximal surfaces of rotational magnetic alignment components 322 and 224 are near each other. This attractive magnetic force can help to rotate case 200 and wireless charging device 300 into a preferred rotational orientation in which the proximal surfaces of rotational magnetic alignment components 322 and 224 are in closest proximity to each other. Examples of magnetic orientations for rotational magnetic alignment components 322 and 224 that can be used to provide a desired attractive force are described below. In some embodiments, rotational magnetic alignment component 322 and rotational magnetic alignment component 224 can have the same lateral dimensions and the same thickness. The dimensions can be chosen based on a desired magnetic field strength, the dimensions of devices in which the rotational magnetic alignment components are to be deployed, and other design considerations.

Figure 7:
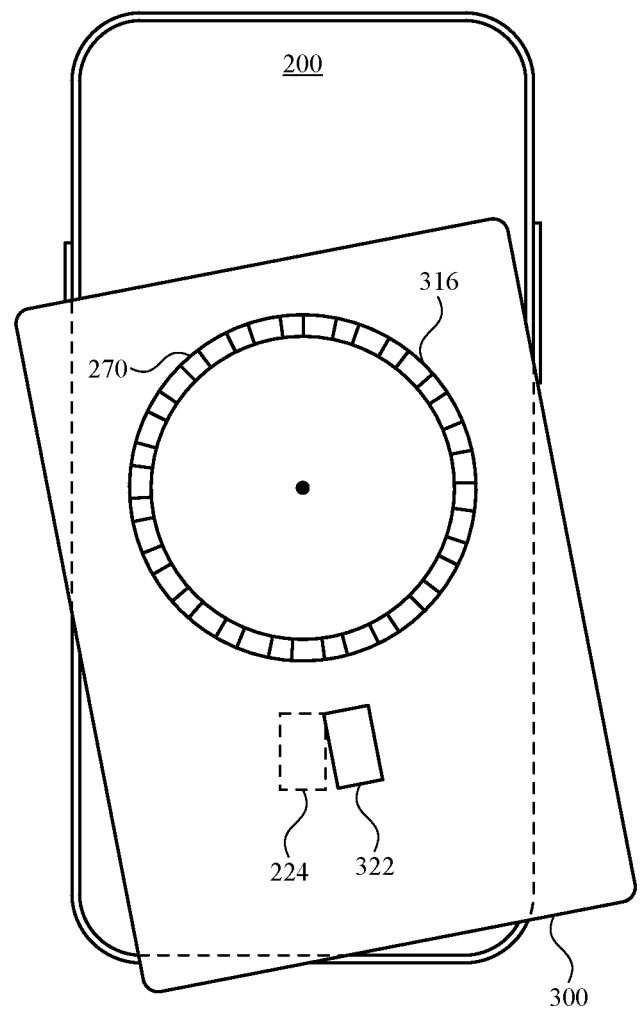
FIGS. 7 and 8 show an example of rotational alignment according to some embodiments.
Figure 8:
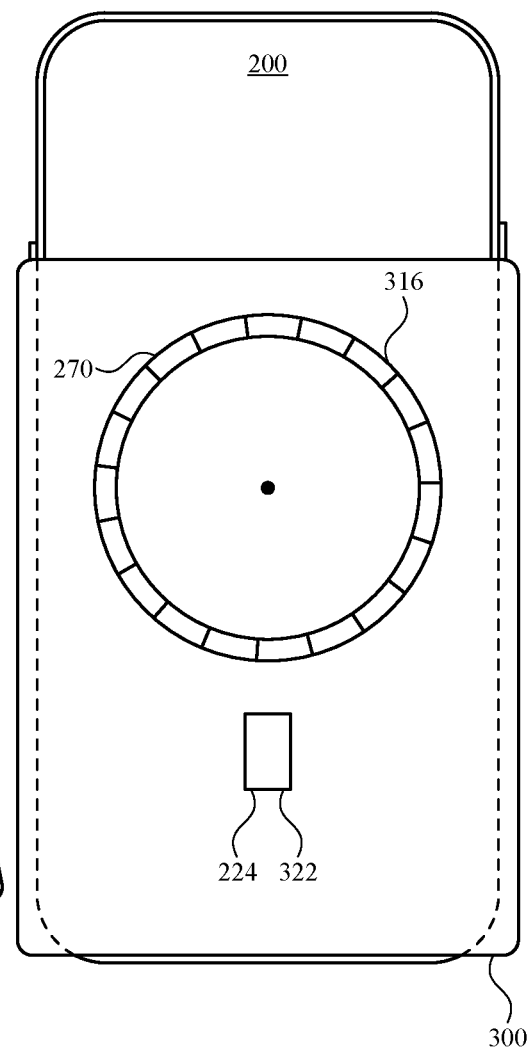

FIGS. 7 and 8 show an example of rotational alignment according to some embodiments. In FIG. 7, wireless charging device 300 is placed on the back surface of case 200 such that annular magnetic alignment component 316 and annular magnetic alignment component 270 are aligned with each other in the lateral plane (which is the plane of the page in FIG. 7); in the view shown, center point 303 of annular magnetic alignment component 316 overlies center point 203 of annular magnetic alignment component 270. A relative rotation is present such that rotational magnetic alignment components 322 and 224 are not aligned. In this configuration, an attractive force between rotational magnetic alignment components 322 and 224 can help guide case 200 and wireless charging device 300 into a target rotational orientation as shown in FIG. 8. In FIG. 8, the attractive magnetic force between rotational magnetic alignment components 322 and 224 has brought case 200 and wireless charging device 300 into the target rotational alignment with the sides of case 200 parallel to the sides of wireless charging device 300. In some embodiments, the same attractive magnetic force between rotational magnetic alignment components 322 and 224 can help to hold case 200 and wireless charging device 300 in a fixed rotational alignment.

Rotational magnetic alignment components 322 and 224 can have various patterns of magnetic orientations. As long as the magnetic orientations of rotational magnetic alignment components 322 and 224 are complementary to each other, a torque toward the target rotational orientation can be present when the devices are brought into lateral alignment and close to the target rotational orientation.

Figure 9:
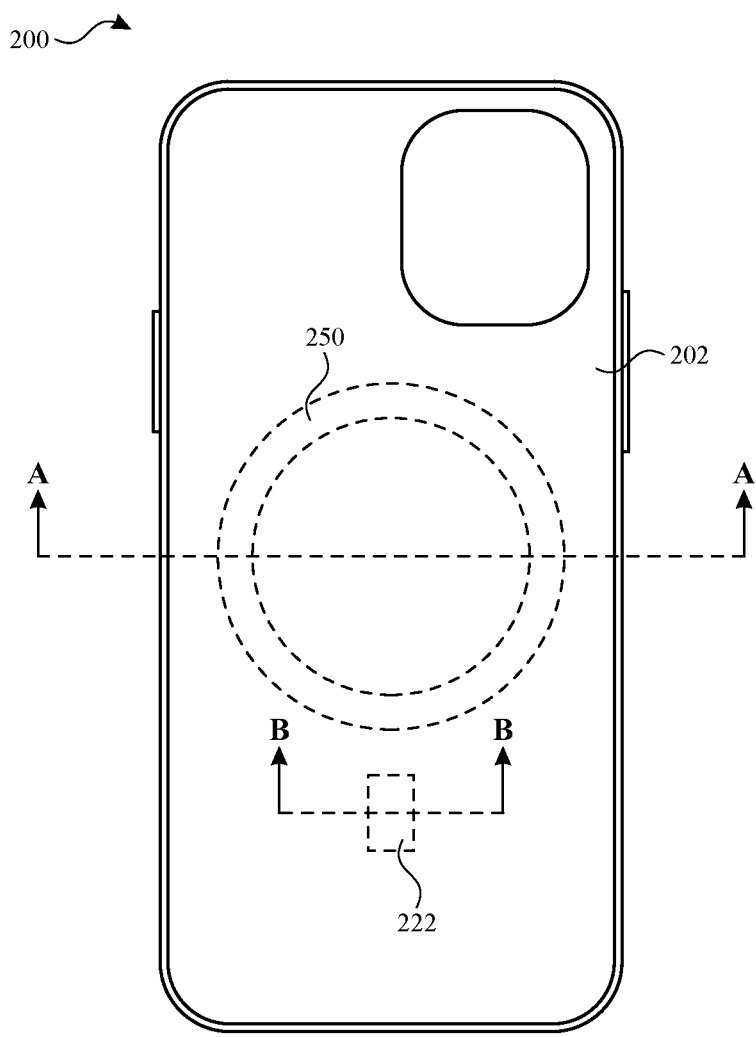
FIG. 9 shows a simplified front view of a case incorporating a magnetic alignment component according to some embodiments.

FIG. 9 shows a simplified front view of a case incorporating a magnetic alignment component according to some embodiments. Case 200 can be, for example, a protective or aesthetic case for a portable electronic device 100 such as the smart phone described above. Accordingly, case 200 can have a body 202, which can be the same size as (or slightly larger than) portable electronic device 100. An annular assembly 250 can be securely embedded within the body 202. The annular assembly 250 can include an auxiliary alignment component (e.g., an annular arrangement of magnets) and a near-field communication (NFC) coil to support wireless data transfer between case 200 and the portable electronic device, for instance to allow case 200 to identify itself to portable electronic device, as described further herein. An alignment assembly 222 can be securely embedded within the body 202 at a different location. The alignment assembly 222 can include a rotational magnetic alignment component (e.g., one or more magnets), as described further herein.

Figure 10:
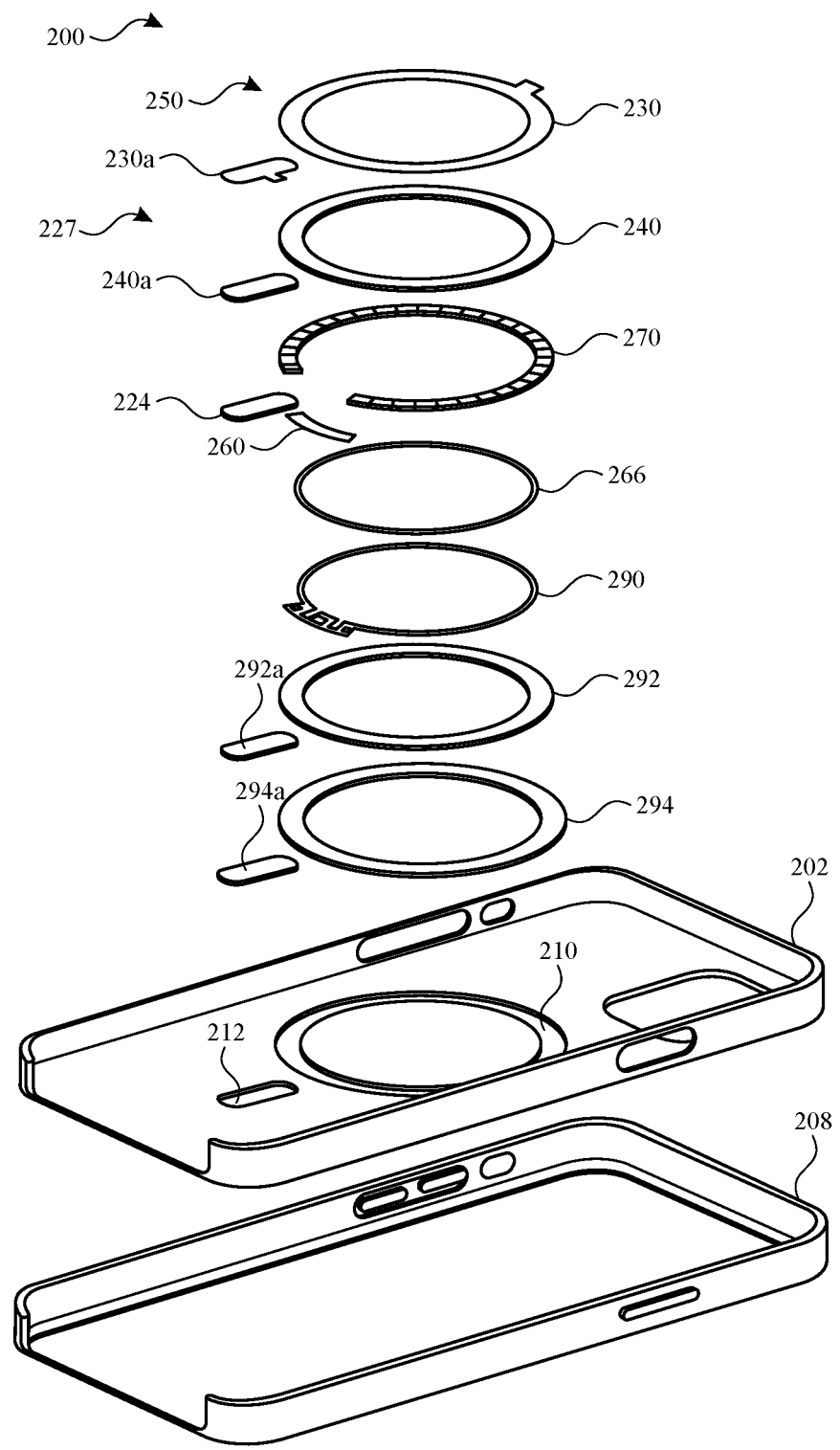
FIG. 10 shows an exploded perspective view of a case incorporating a magnetic alignment component according to some embodiments.

FIG. 10 shows an exploded perspective view of a case incorporating a magnetic alignment component according to some embodiments. As shown in FIG. 10, the body 202 can and annular cavity 210 for receiving the annular assembly 250. The body 202 can further include additional cavity 212 for receiving the alignment assembly 222. The assemblies can be provided in an assembled or at least partially assembled state when inserted into the corresponding cavity. The assemblies can be provided together or separately when inserted. An amount of adhesive 294 and/or 294a can be provided for securing the corresponding assemblies in the corresponding cavities. Optionally, the body 202 can include or be provided with an outer shell 208, such as a layer that is formed with (e.g., comolded onto) an outer surface of at least a portion of the body 202. The outer layer can optionally have one or more features that are different than those of the body 202, such as color, material, texture, opacity, and the like.

As further shown in FIG. 10, the annular assembly 250 can include a bottom layer 292 defining a bottom most end of the annular assembly 250. The bottom layer 292 can define a leading surface for insertion of the annular assembly 250 into the cavity 210 and the adhesive 294. The bottom layer 292 can provide a color or other aesthetic features for observation through the body 202, as discussed further herein. As further shown in FIG. 10, the annular assembly 250 can further include an annular magnetic alignment component 270, an NFC coil 266, and a shim 290. As further shown in FIG. 10, the annular assembly 250 can further include a top layer 240. The top layer 240 can define a topmost surface of the annular assembly 250 in a final stage of assembly. The annular assembly 250 can temporarily include or be provided with an annular liner 230 for remove during assembly. Other liners can be provided, as described herein. One or more components and/or layers of the annular assembly 250 can be coupled together with an adhesive (e.g., other than the adhesive 294). For example, a pressure-sensitive adhesive can be provided between stacked components to secure them in a relative position and/or orientation.

As further shown in FIG. 10, the alignment assembly 222 can include a bottom layer 292a defining a bottom most end of the alignment assembly 222. The bottom layer 292a can define a leading surface for insertion of the alignment assembly 222 into the cavity 212 and the adhesive 294a. The bottom layer 292 can provide a color or other aesthetic features for observation through the body 202, as discussed further herein. As further shown in FIG. 10, the alignment assembly 222 can further include a rotational magnetic alignment component 224. As further shown in FIG. 10, the alignment assembly 222 can further include a top layer 240a. The top layer 240a can define a topmost surface of the alignment assembly 222 in a final stage of assembly. The alignment assembly 222 can temporarily include or be provided with an additional liner 230a for remove during assembly. Other liners can be provided, as described herein. One or more components and/or layers of the alignment assembly 222 can be coupled together with an adhesive (e.g., other than the excess portion 294b of the adhesive 294). For example, a pressure-sensitive adhesive can be provided between stacked components to secure them in a relative position and/or orientation.

Figure 11:
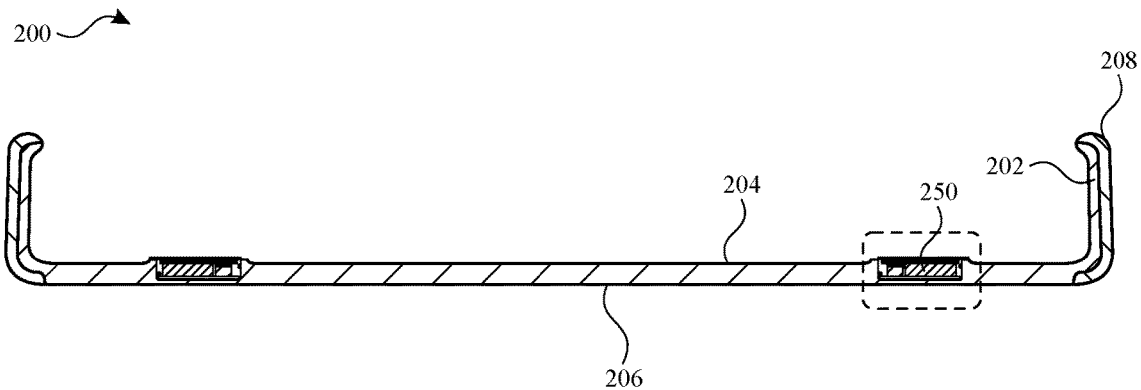
FIG. 11 shows a sectional bottom view of the case taken along line A-A of FIG. 9 according to some embodiments.

FIG. 11 shows a sectional bottom view of the case taken along line A-A of FIG. 9 according to some embodiments. As shown in FIG. 11, the body 202 can be shaped as a tray that covers the side and rear surfaces of portable electronic device, leaving the front (display) surface of portable electronic device 100 exposed. The body 202 and/or the outer shell 208 (or portions thereof) can be made of plastic (e.g., polycarbonate), rubber, silicone, leather, and/or other materials. The body 202 and/or the outer shell 208 can include or be provided with additional layers, such as inner layer 204 and outer layer 206.

Figure 12:
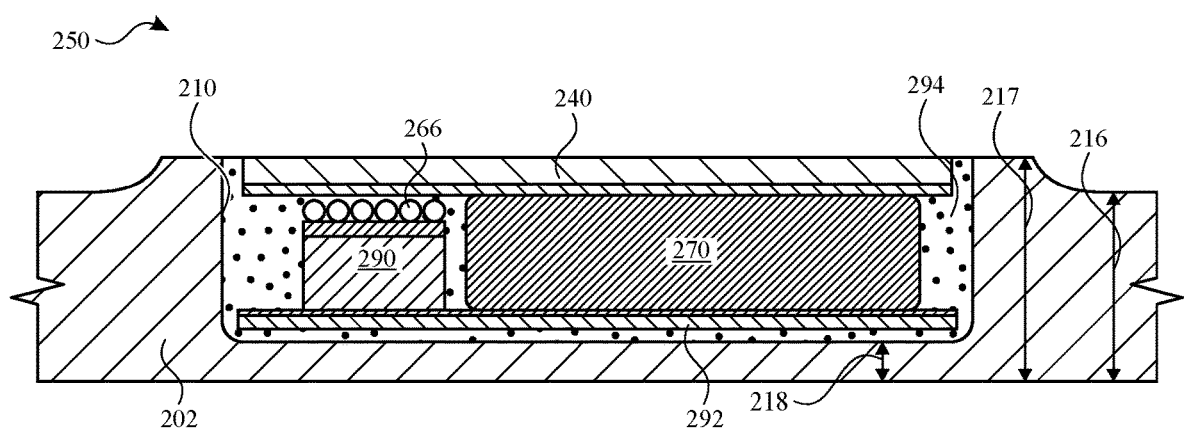
FIG. 12 shows an enlarged view of a portion of the case of FIG. 11 according to some embodiments.

FIG. 12 shows an enlarged view of a portion of the case of FIG. 11 according to some embodiments. It may be desirable to make the case thin and to provide smooth inner and outer surfaces. In some embodiments, magnets of the annular magnetic alignment component 270 can have a thin axial dimension so that case 200 can have smooth surfaces and a desired thinness. At the same time, it can desirable to provide the body 202 with adequate thickness at various locations. For example, the body 202 can define a thickness 216 extending across a significant portion of the body 202. The body 202 can define a cavity 210 providing a depth sufficient to house the annular assembly 250. To provide such a depth while maintaining an adequate thickness 218 beneath cavity 210, the body 202 can include an enlarged thickness 217, greater than the thickness 216, adjacent to the cavity 210. Such an enlarged thickness 217 can allow the cavity 210 to extend to an adequate depth while providing adequate thickness 218 beneath cavity 210.

As shown in FIG. 12, the NFC coil 266 of the annular assembly 250 can be provided in the region interior to annular magnetic alignment component 270. The NFC coil 266 can be supported on the shim 290 to elevate the NFC coil 266 toward the portable electronic device when held by the case 200. The combined thickness of the NFC coil 266 and the shim 290 can be substantially equal to the thickness of the annular magnetic alignment component 270. As such, the separation between the top layer 240 and the bottom layer 292 can be substantially consistent across the annular magnetic alignment component 270, the NFC coil 266, and the shim 290.

Referring now to FIGS. 13-21, a process and its stages are illustrated for assembling a case having an annular magnetic component and an NFC coil embedded therein. For explanatory purposes, the process is primarily described herein with reference to the case 200. Further for explanatory purposes, the stages of the process need not be performed in the order shown and/or one or more stages of the process need not be performed and/or can be replaced and/or supplemented by other operations.

Figure 13:
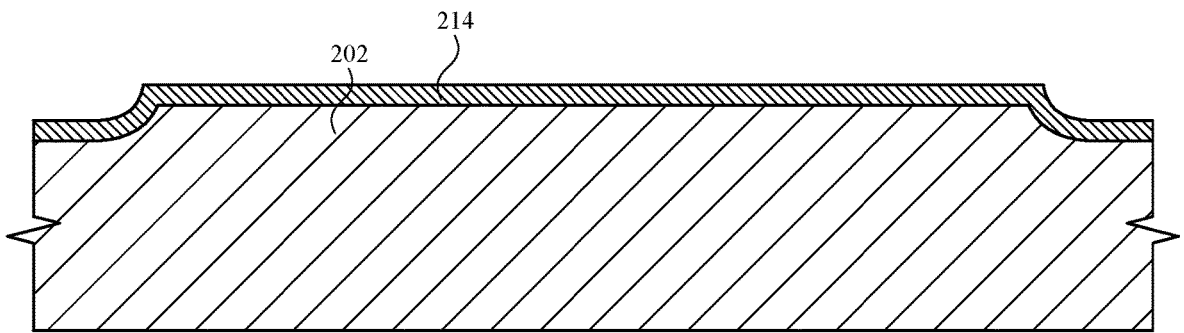
FIG. 13 shows a stage of assembly of a case having a body according to some embodiments.

As shown in FIG. 13, the body 202 can be provided in an initial stage. The body 202 can be formed as described herein, for example, by molding or another process. The body 202 can be provided with a mask 214 on an inner side thereof. The mask 214 can be provided as a liquid and allowed to solidify. The mask 214 can provide a protective layer to separate the body 202 from deposits provided thereon by allowing the mask 214 and any deposits to be removed at a later stage.

Figure 14:
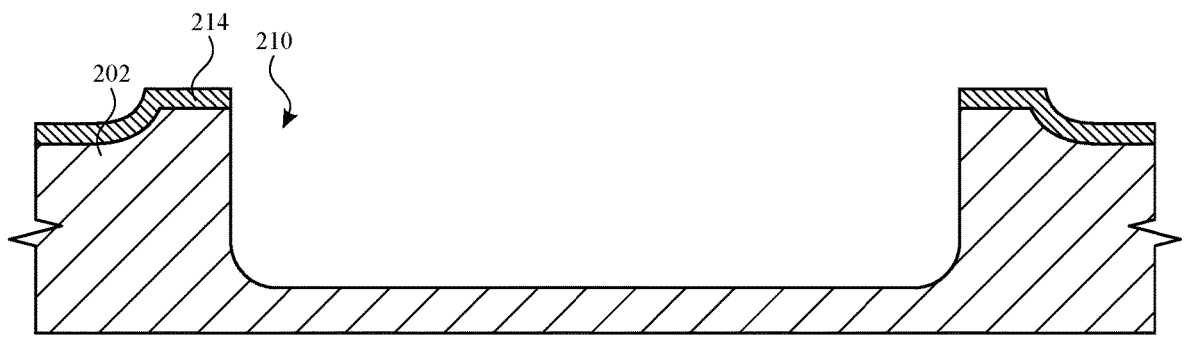
FIG. 14 shows another stage of assembly of the case having an annular cavity in the body according to some embodiments.

As shown in FIG. 14, the cavity 210 can be formed within the body 202 and extending through the mask 214. The cavity 210 can be formed, for example, by a machining process (e.g., computer numerical control "CNC" machining). The cavity 210 can form an annular shape or other shape. The cavity 210 can be defined, at least in part, by walls that extend from one side of the body 202 toward a second side of the body 202, opposite the first side.

Figure 15:
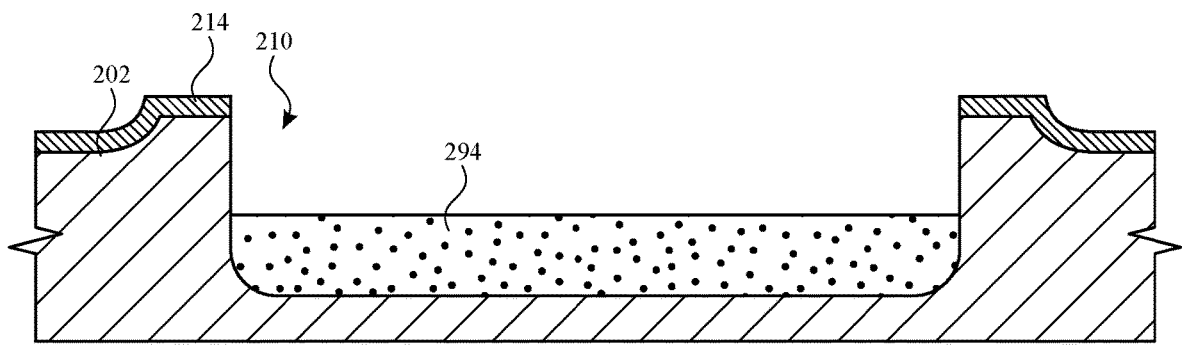
FIG. 15 shows another stage of assembly of the case having an adhesive in the annular cavity according to some embodiments.

As shown in FIG. 15, and adhesive 294 can be provided within the cavity 210. The adhesive 294 can be provided as a liquid or other malleable substance into which an assembly can be received. The adhesive 294 can fill any portion of the cavity 210. For example, the adhesive 294 can fill less than an entirety of the cavity 210. Sufficient adhesive 294 can be provided such that the adhesive 294 and the assembly fill the cavity 210 when provided therein. An excess amount of adhesive 294 can be removed in a later stage.

Figure 16:
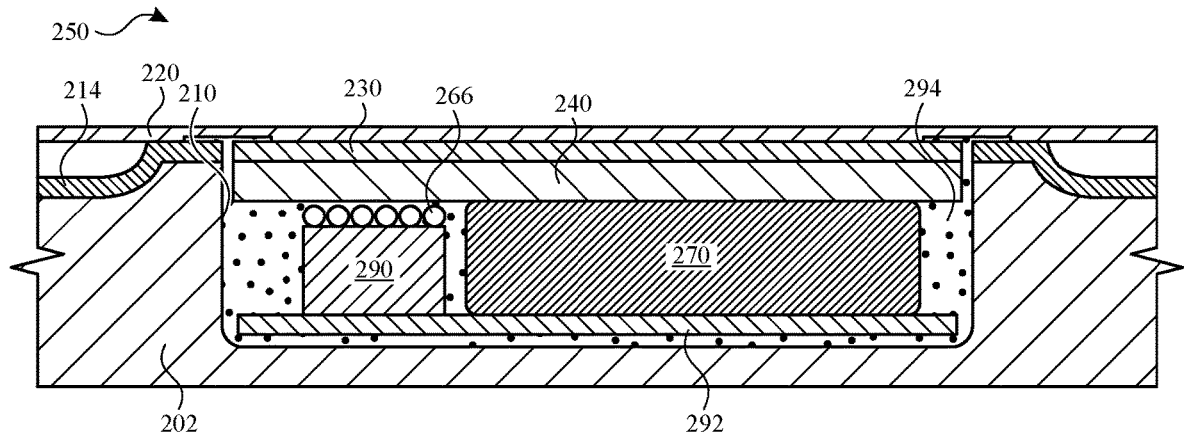
FIG. 16 shows another stage of assembly of the case having an assembly inserted into the annular cavity according to some embodiments.

As shown in FIG. 16, the annular assembly 250 can be inserted into the cavity 210. As the annular assembly 250 is inserted, the bottom layer 292 of the annular assembly 250 can lead the other components thereof. The bottom layer 292 can form a continuous surface that pushes the adhesive 294 outwardly as the annular assembly 250 is inserted. Accordingly, the annular assembly 250 can enter the adhesive 294 without forming air bubbles that would otherwise become trapped within the cavity 210. Instead, the adhesive 294 can be urged to sides of the annular assembly 250 to fill interstitial spaces between the components thereof and rise to the top of the cavity 210. The annular assembly 250 can provide the top layer 240 to be flush with a surface of the body 202 adjacent to the cavity 210 when an annular liner 230 is flush with a surface of the mask 214. As such, when the annular liner 230 and the mask 214 are removed in a subsequent stage, the remaining top layer 240 and the body 202 can be flush with each other to provide a continuous and flat surface separated only by a portion of the adhesive. The annular assembly 250 can be further provided with an assembly liner 220 that extends across the components of the annular assembly 250 and portions of the body 202. Excess portions 294b of the adhesive 294 that are displaced above the cavity 210 can be trapped between the assembly liner 220 and the mask 214 and/or the annular liner 230.

Figure 17:
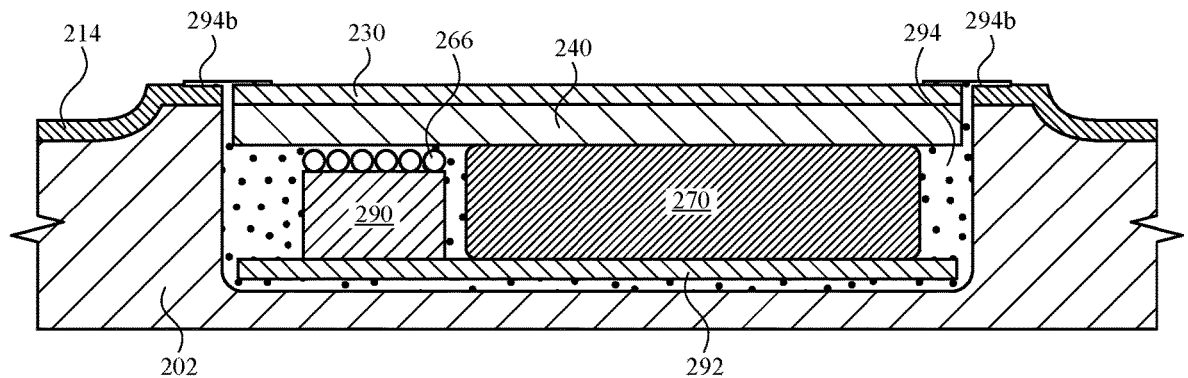
FIG. 17 shows another stage of assembly of the case following removal of an assembly liner according to some embodiments.

As shown in FIG. 17, the assembly liner 220 can be removed from the annular assembly 250 and portions of the mask 214. The excess portions 294b of the adhesive 294 that were displaced above the cavity 210 will then be exposed on the mask 214 and/or the annular liner 230.

Figure 18:
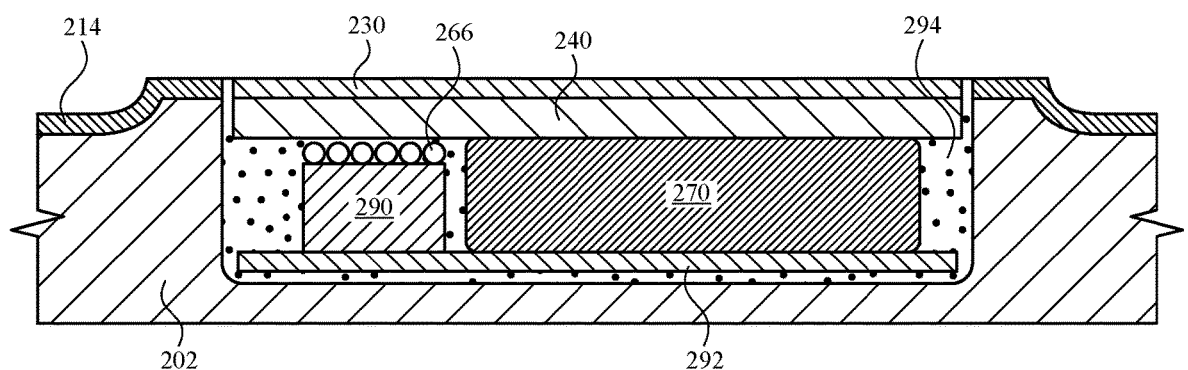
FIG. 18 shows another stage of assembly of the case following removal of a portion of the adhesive according to some embodiments.

As shown in FIG. 18, excess portions of the adhesive 294 exposed on the mask 214 and/or the annular liner 230 can be removed. Such removal can optionally be performed while the adhesive 294 is in a liquid state. Accordingly, the annular liner 230, the surface of the adhesive 294, and the surface of the mask 214 can form a flat and continuous surface. In such a condition, the adhesive 294 can be allowed to cure.

Figure 19:
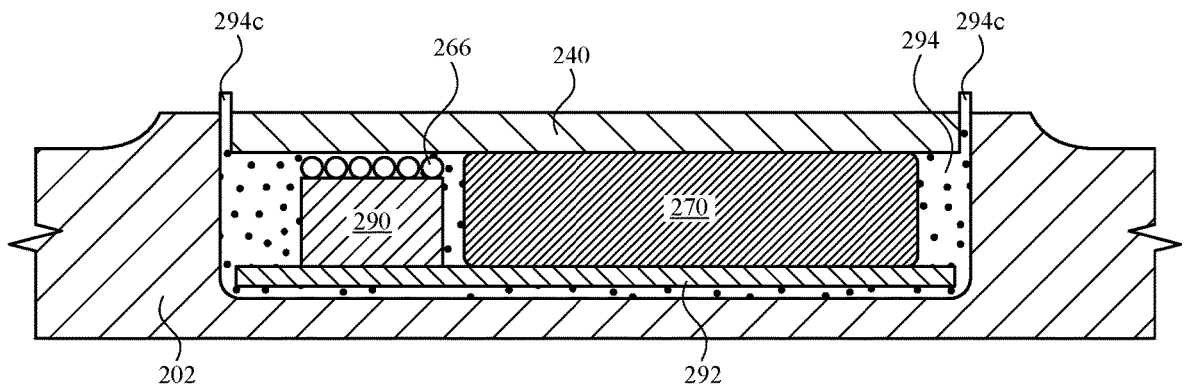
FIG. 19 shows another stage of assembly of the case following removal of an annular liner according to some embodiments.

As shown in FIG. 19, after the adhesive 294 has cured, the annular liner 230 and the mask 214 can be removed from the remaining components of the annular assembly 250 and portions of the body 202. The excess portions 294c of the adhesive 294 that were between the mask 214 and the annular liner 230 will then be exposed as extending beyond the body 202 and the top layer 240.

Figure 20:
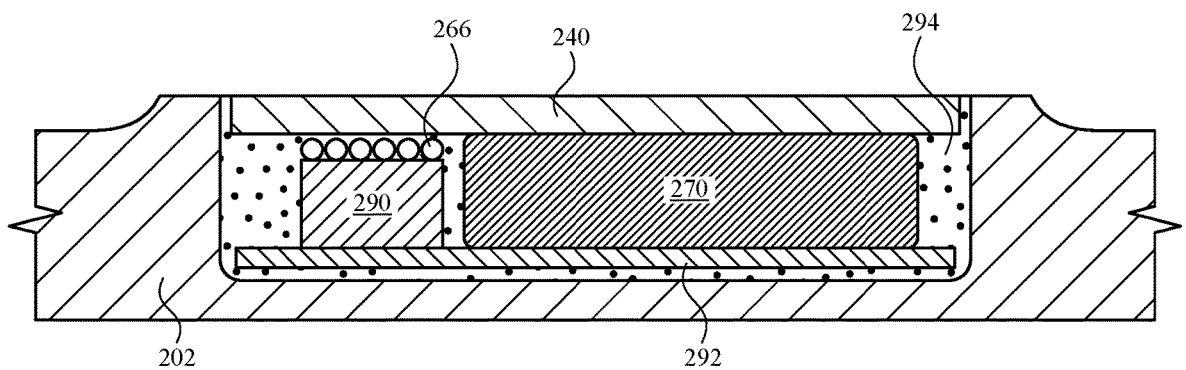
FIG. 20 shows another stage of assembly of the case following removal of a portion of the adhesive according to some embodiments.

As shown in FIG. 20, excess portions of the adhesive 294 extending beyond the body 202 and/or the top layer 240 can be removed. Such removal can optionally be performed while the adhesive 294 is cured (e.g., solid). Accordingly, the top layer 240, the surface of the adhesive 294, and the surface of the body 202 can form a flat and continuous surface.

Figure 21:
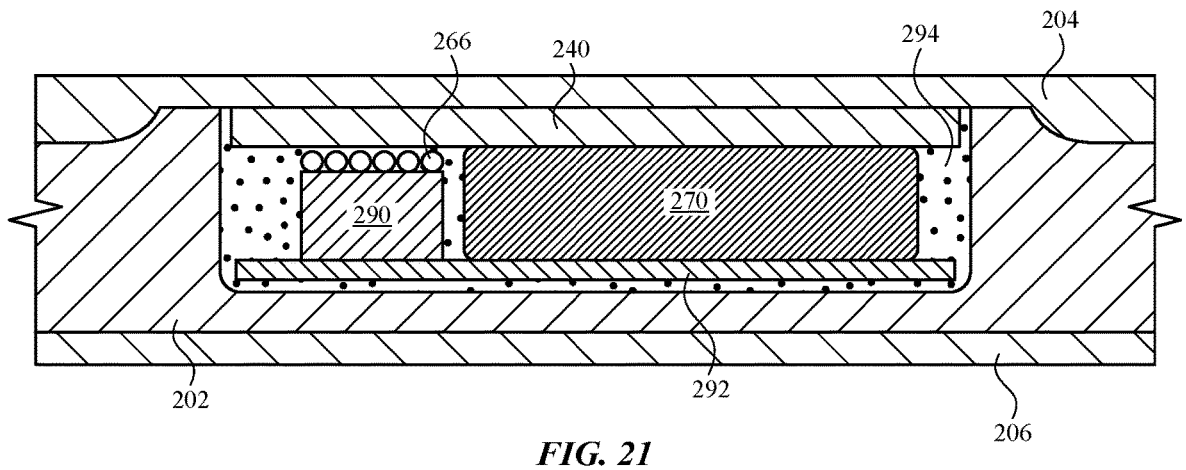
FIG. 21 shows another stage of assembly of the case having a front layer and a back layer according to some embodiments.

As shown in FIG. 21, additional layers can optionally be provided to the body 202, such as the inner layer 204 and/or the outer layer 206. The inner layer 204 can be of a material for gently contacting the portable electronic device. For example, the inner layer 204 can include microfiber, another fabric, foam, rubber, and the like. The inner layer 204 can be selected for dissipating heat and/or avoiding damage to the portable electronic device.

The outer layer 206 can be of a material for contact by the user. For example, the outer layer 206 can include plastic, rubber, silicone, leather, and/or other materials.

In some embodiments, the body 202, the inner layer 204, and/or the outer layer 206 (or portions thereof) can be made of transparent and/or at least partially translucent material(s) so that the rear surface of portable electronic device can be seen through case. To mask the appearance of the NFC coil 266, the shim 290, and/or the annular magnetic alignment component 270, the top layer 240 and/or the bottom layer 292 can include an opaque material. Accordingly, the appearance of the components between the top layer 240 and the bottom layer 292 can be hidden from view.

The body 202 can include or be coupled to an outer layer 206 and an inner layer 204 that contacts rear housing of the portable electronic device. In some embodiments, the body 202, the inner layer 204, and/or the outer layer 206 can be opaque and the annular assembly 250 embedded therein need not be visible to a user.

Additionally or alternatively, the body 202, the inner layer 204, and/or the outer layer 206 can be at least partially translucent and at least a portion of the annular assembly 250 embedded therein can be at least partially visible to a user. It can be desirable to hide the appearance of certain components of the assembly from view.

In some embodiments, an opaque material of the top layer 240 and/or the bottom layer 292 can match a color of the inner layer 204 and/or the outer layer 206. For example, while the top layer 240 may be seen through a transparent and/or at least partially translucent material of the inner layer 204, the top layer 240 can have a color and opacity that appears identical, when viewed through the inner layer 204, to the inner layer 204 itself. By further example, while the bottom layer 292 may be seen through a transparent and/or at least partially translucent material of the outer layer 206, the bottom layer 292 can have a color and opacity that appears identical, when viewed through the outer layer 206, to the outer layer 206 itself. Accordingly, the appearance of the assembly within the body 202 can be indistinguishable from the body 202, the inner layer 204, and/or the outer layer 206 along regions thereof without the assembly.

Figure 22:
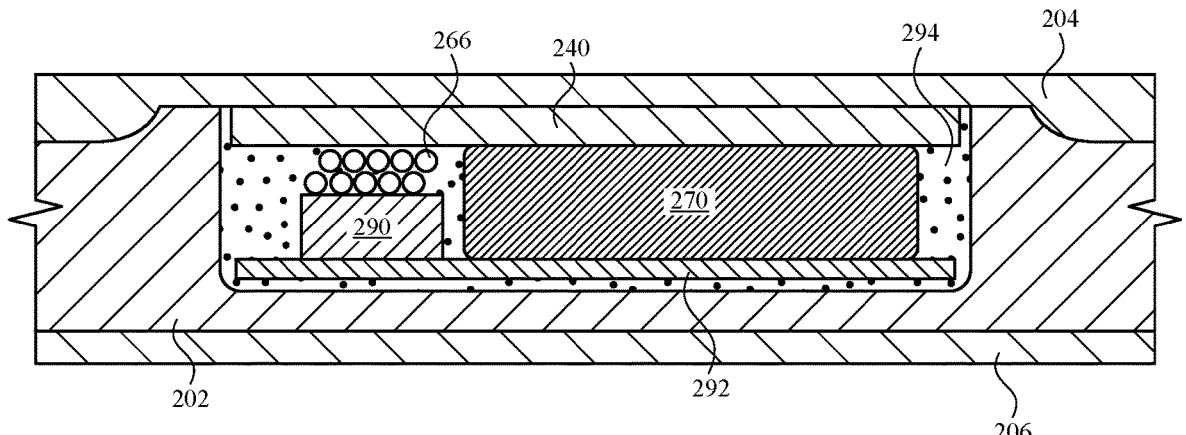
FIG. 22 shows a sectional bottom view of another case according to some embodiments.
Figure 23:
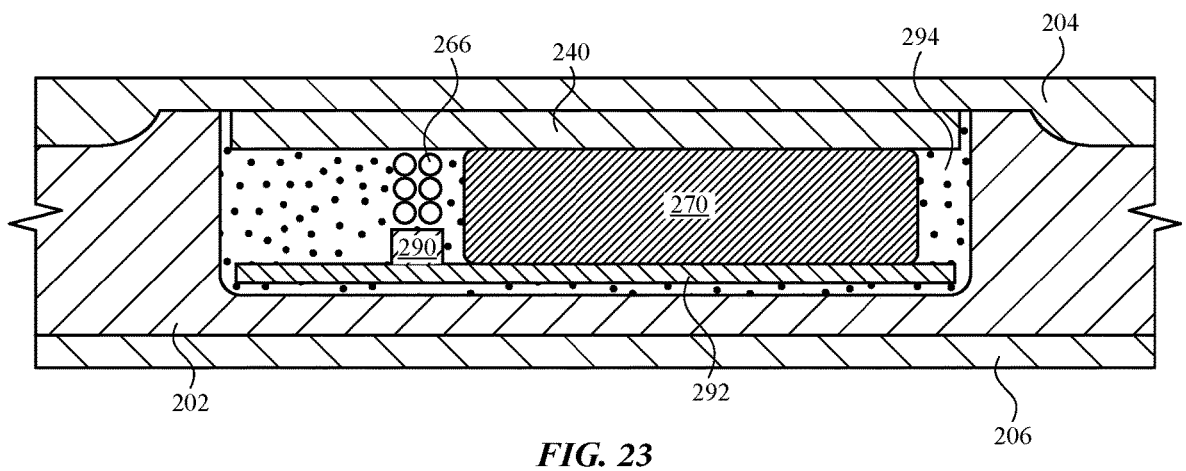
FIG. 23 shows a sectional bottom view of another case according to some embodiments.
Figure 24:
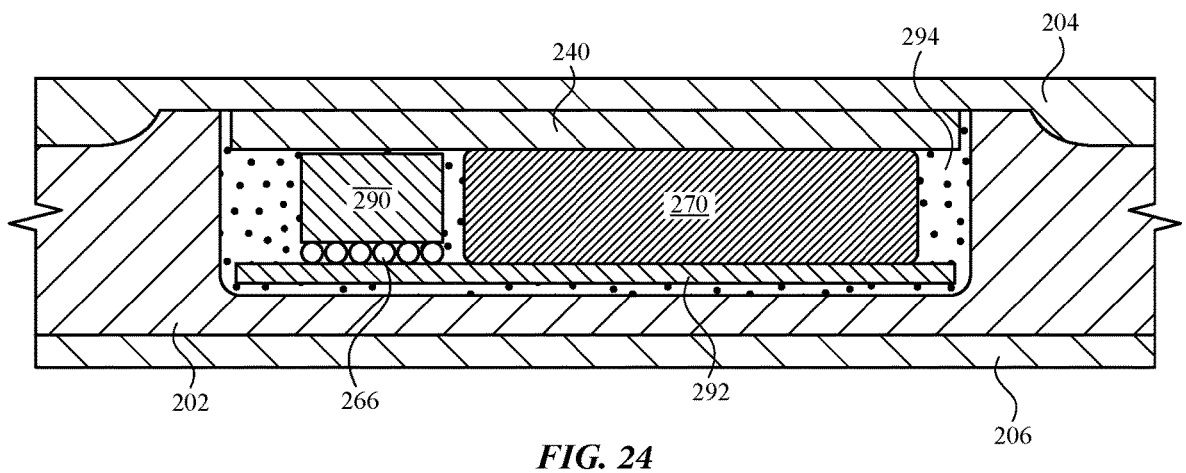
FIG. 24 shows a sectional bottom view of another case according to some embodiments.

Referring now to FIGS. 22-24, one or more features of the case can be altered to provide different performance characteristics. Such alterations can be provided by modifying one or more of the assembly steps described herein, while other assembly steps can remain the same.

As shown in FIG. 22, multiple layers can be provided to form the NFC coil 266. Each of the layers can optionally include multiple windings, and the layers can be stacked upon each other. By providing additional layers, the inductance of the NFC coil 266 can be increased, thereby increasing its sensitivity (e.g., induced voltage) and/or output (e.g., signal strength). Optionally, the windings can be at least partially nested within each other in a compact arrangement. For example, the wires can be arranged in a hexagonal packing, as shown in the sectional view of FIG. 22. Other arrangements are contemplated, such as square packing (see FIG. 23). In some embodiments, the multiple layers of the NFC coil 266 can be supported on the shim 290 to elevate the NFC coil 266 toward the portable electronic device when held by the case 200. One of the end layers can abut the shim 290. The combined thickness of the NFC coil 266 and the shim 290 can be substantially equal to the thickness of the annular magnetic alignment component 270.

As shown in FIG. 23, multiple layers can be provided to form the NFC coil 266 in a shape that is taller than it is wide (i.e., in cross-section). The windings can be in number and arrangement to provide columns and rows. Whereas the NFC coil 266 of FIG. 22 shows a greater number of columns than rows, the NFC coil 266 of FIG. 23 shows a greater number of rows than columns. The multiple layers of the NFC coil 266 can be supported on a shim 290 with a shape and/or size that corresponds to that of the NFC coil 266. The combined thickness of the NFC coil 266 and the shim 290 can be substantially equal to the thickness of the annular magnetic alignment component 270. By providing a narrow NFC coil 266 with additional layers (e.g., rows), the inductance of the NFC coil 266 can be achieved while providing a larger internal diameter of the NFC coil 266. As such, the space within the NFC coil 266 and shim 290 for other activities (e.g., wireless charging) can be increased as desired. Additionally or alternatively, the NFC coil 266 and the shim 290 can be shifted radially inwardly to increase the space radially outside the NFC coil 266 and the shim 290. Such an arrangement can provide additional space for the annular magnetic alignment component 270. With a larger annular magnetic alignment component 270, the magnetic engagement provided therewith can be increased.

As shown in FIG. 24, the NFC coil 266 and the shim 290 can be provided in one of a variety of arrangements. For example, the NFC coil 266 can be provided below the shim 290, for example, by placing the NFC coil 266 against the bottom layer 292 and placing the shim 290 against the NFC coil 266. The top layer 240 can then be placed on the shim 290. Such an arrangement increases the distance of the NFC coil 266 from the phone that is held within the case. This can reduce interference between the NFC coil 266 and other accessories with which the phone may communicate. Additionally or alternatively, the NFC coil 266 can be closer to other devices placed on the bottom side of the case, thereby increasing the signal strength of communications between the NFC coil 266 and such a device, where applicable.

Figure 25:
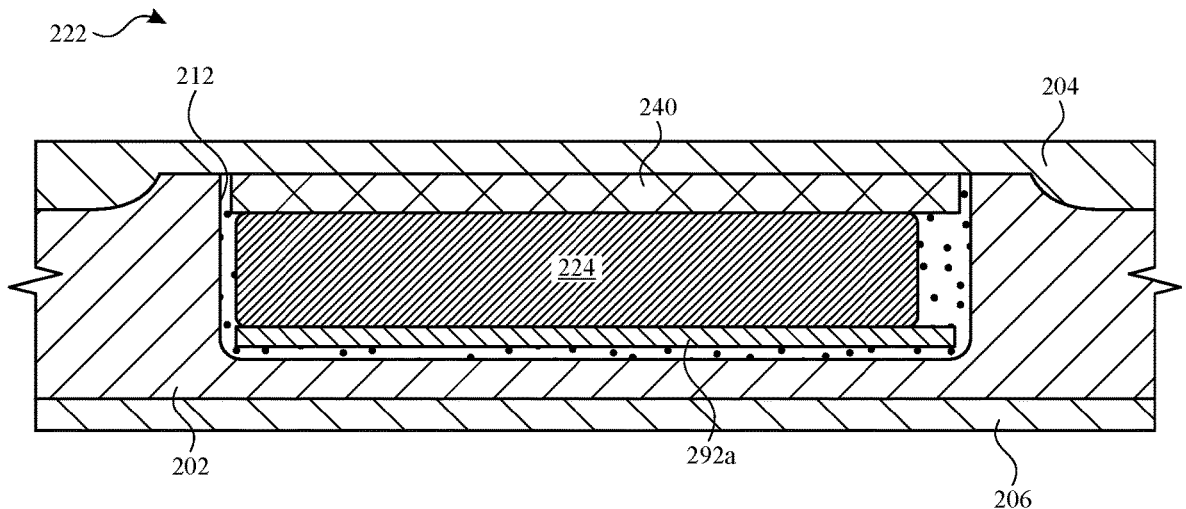
FIG. 25 shows an enlarged sectional bottom view of the case taken along line B-B of FIG. 9 according to some embodiments.

Referring now to FIG. 25, an assembly that includes a rotational magnetic alignment component can be provided as described herein for other assemblies. FIG. 254 shows an enlarged sectional bottom view of the case taken along line B-B of FIG. 9 according to some embodiments. It will be understood that the methods, structures, arrangements, and compositions described herein with regard to the annular assembly 250 can be applied to the alignment assembly 222. For example, a cavity 212 can be formed and the alignment assembly 222 provided therein as described with respect to the annular assembly 250 of FIGS. 13-21. Additionally, the bottom layer 292*a* and the top layer 240*a* of the alignment assembly 222 can provide visual features described herein with respect to the top layer 240 and the bottom layer 292 of the annular assembly 250.

Figure 26:
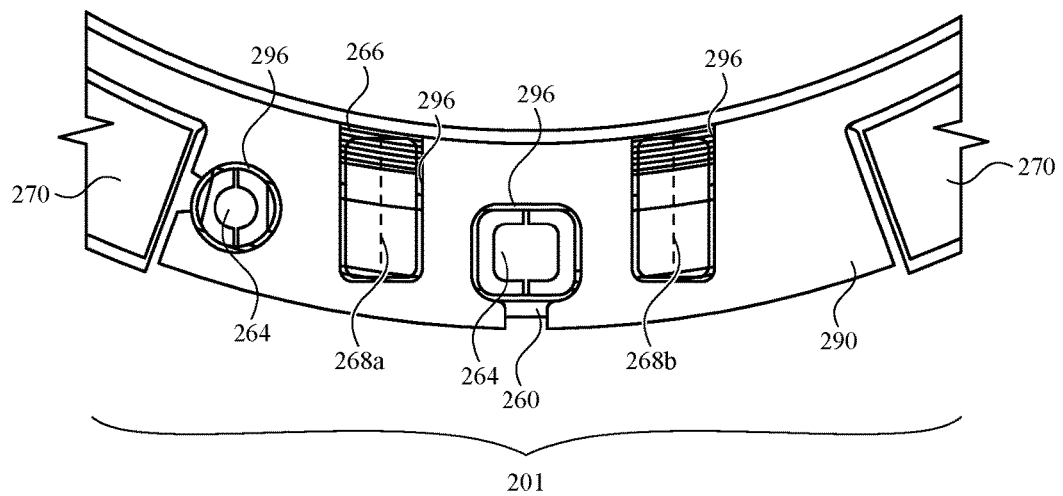
FIG. 26 shows a top view of a portion of an assembly including control circuitry according to some embodiments.
Figure 27:
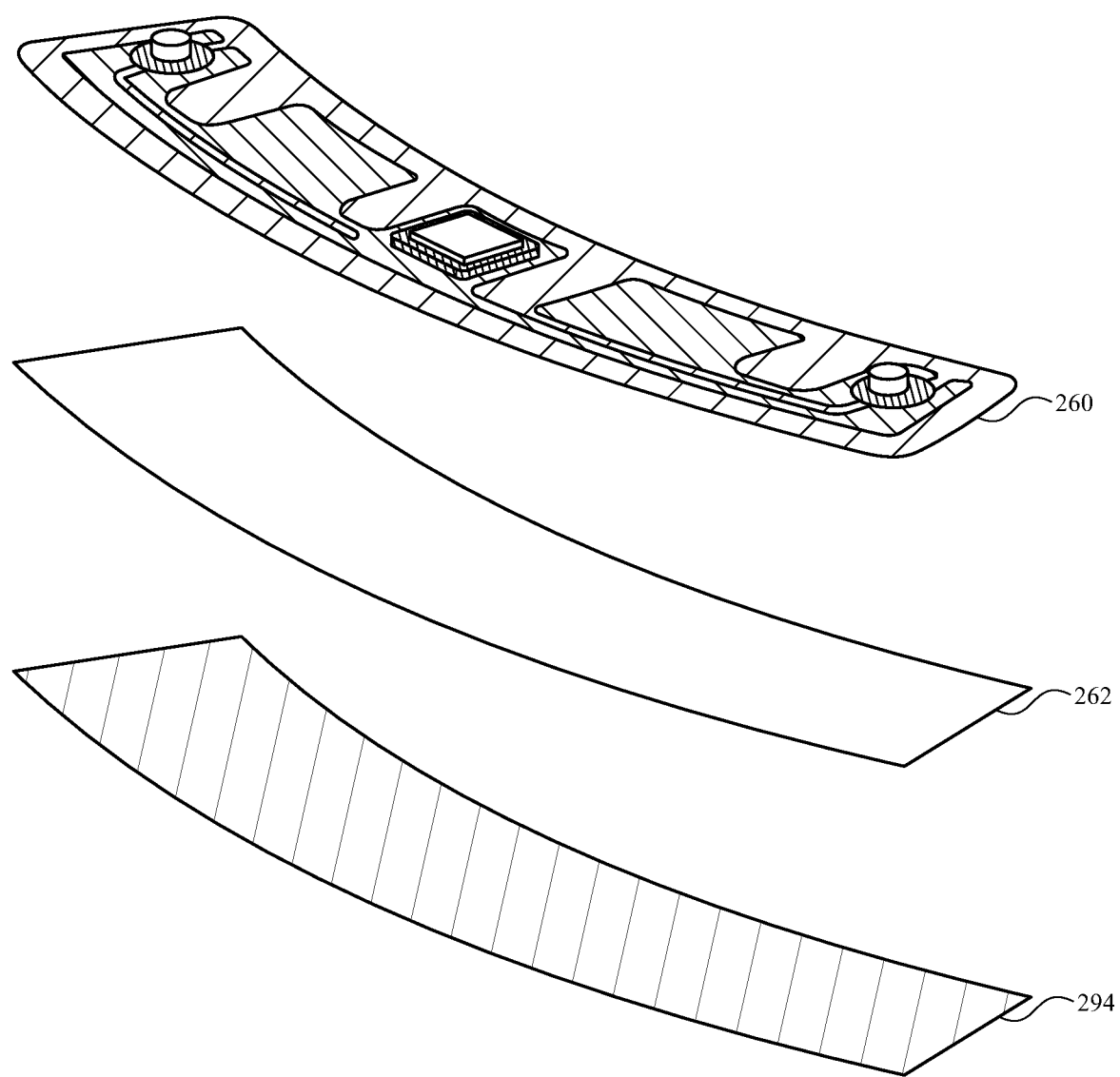
FIG. 27 shows an exploded perspective view of a portion of an assembly including control circuitry according to some embodiments.

Referring now to FIGS. 26 and 27, electronic components operably connected to or part of the NFC coil can be provided in a compact form factor within the assembly embedded in the case. FIG. 26 shows a top view of a portion of an assembly including electronic components 264 according to some embodiments. The NFC coil 266 of the assembly can be provided radially within the annular magnetic alignment component 270 and axially overlapping the shim 290. In some embodiments, the shim 290 can extend radially outwardly within a gap 201 between magnets of the annular magnetic alignment component 270 to further overlap a circuit board 260 that is also disposed in the gap 201 between magnets of the annular magnetic alignment component 270. In other embodiments, the shim 290 need not extend radially outwardly, have any portion thereof between magnets of the annular magnetic alignment component 270, or overlap the circuit board 260, as described further herein. The circuit board 260 can contain one or more electronic components 264 that extend from the circuit board 260 into openings 296 of the shim 290. Such openings accommodate the electronic components 264 within an axial space. The electronic components 264 can optionally be encapsulated, for example, with potting, overmolding, insert molding, caps, and the like. The encapsulation can provide electrical insulation and/or opacity to hide the electronic components. Additional openings 296 in the shim 290 can accommodate termination ends 268*a* and 268*b* of the NFC coil 266.

FIG. 27 shows an exploded perspective view of a portion of an assembly including control circuitry according to some embodiments. As described herein, the shim need not provide support to the assembly. For example, the assembly can include the circuit board 260 and a stiffener 262 that provides structural support with its rigidity. The stiffener 262 can include a metal, plastic, or other hard material(s). In an assembled configuration, the stiffener 262 can be positioned within a gap between magnets of the annular magnetic alignment component to overlap the circuit board 260 that is also disposed in the gap between magnets of the annular magnetic alignment component (e.g., in the position of a portion of the shim in FIG. 26). As such, the stiffener 262 can be provided separately from the shim to provide support to the circuit board 260. Optionally, the stiffener 262 can be coplanar with the shim. An amount of adhesive 294 can be provided for securing the circuit board 260 and the stiffener 262 in the assembled configuration. For example, a pressure-sensitive adhesive can be provided between stacked components to secure them in a relative position and/or orientation. The adhesive 194 can be a portion of other another adhesive applied elsewhere or separately provided.

Figure 28:
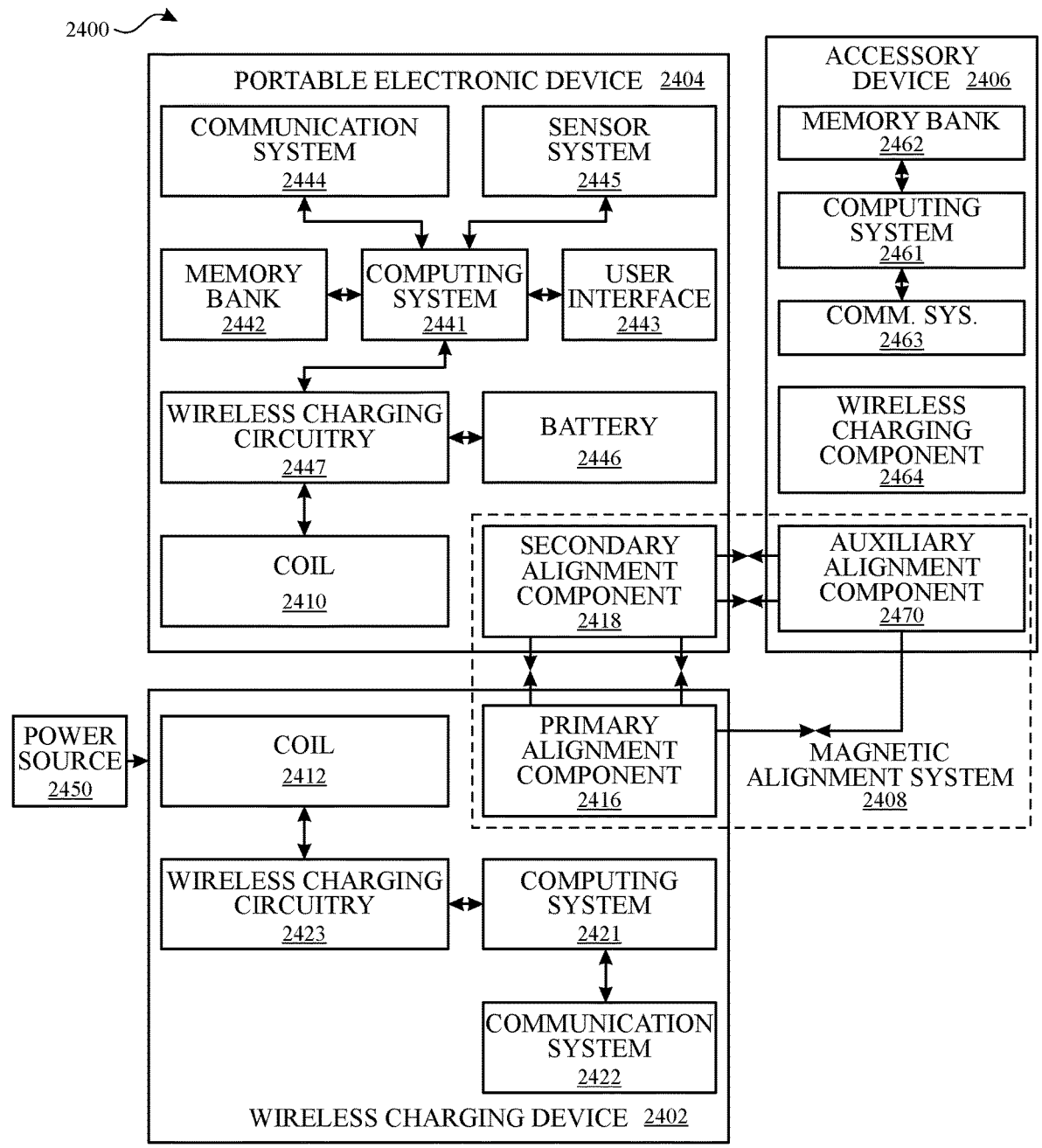
FIG. 28 is a block diagram illustrating an exemplary wireless charging system including devices that can be aligned together via a magnetic alignment system according to some embodiments.

FIG. 28 is a block diagram illustrating an exemplary wireless charging system 2400 including a portable electronic device 2404 (which can be, e.g., portable electronic device 100 or any other portable electronic device described herein), a wireless charging device 2402 (which can be, e.g., wireless charging device 300 or any other wireless charging device described herein), and an accessory device 2406 (which can be, e.g., case 200 or any other accessory device described herein) that can be aligned together via a magnetic alignment system 2408 according to some embodiments. Magnetic alignment system 2408 can include a primary alignment component 2416 within wireless charging device 2402, a secondary alignment component 2418 within portable electronic device 2404, and an auxiliary alignment component 2470 within accessory device 2406. Primary alignment component 2416, secondary alignment component 2418, and auxiliary alignment component 2470 can be constructed according to any of the embodiments described herein. Portable electronic device 2404 can include a computing system 2441 coupled to a memory bank 2442. Computing system 2441 can include control circuitry configured to execute instructions stored in memory bank 2442 for performing various functions for operating portable electronic device 2404. The control circuitry can include one or more programmable integrated logic circuits, such as microprocessors, central processing units (CPUs), graphics processing units (GPUs), field programmable gate arrays (FPGAs), or the like.

Computing system 2441 can also be coupled to a user interface system 2443, a communication system 2444, and a sensor system 2445 for enabling portable electronic device 2404 to perform one or more functions. For instance, user interface system 2443 can include a display, speaker, microphone, actuator for enabling haptic feedback, and one or more input devices such as a button, switch, capacitive screen for enabling the display to be touch sensitive, and the like. Communication system 2444 can include wireless telecommunication components, NFC components, Bluetooth components, and/or Wi-Fi components for enabling portable electronic device 2404 to make phone calls, interact with wireless accessories, and access the Internet. In some embodiments, communication system 2444 can include NFC reader circuitry that is used in connection with magnetic alignment system 2408 to identify one or more aligned devices. Sensor system 2445 can include light sensors, accelerometers, gyroscopes, temperature sensors, magnetometers, and/or any other type of sensor that can measure a parameter of an external entity and/or environment.

All of these electrical components require a power source to operate. Accordingly, portable electronic device 2404 also includes a battery 2446 that can discharge stored energy to power the electrical components of portable electronic device 2404. To replenish the energy discharged to power the electrical components, portable electronic device 2404 includes charging circuitry 2447 and an inductive coil 2410 that can receive power from wireless charging device 2402 coupled to an external power source 2450.

Wireless charging device 2402 can include a transmitter coil 2412 for generating time-varying magnetic flux capable of inducing an electrical current in coil 2410 of portable electronic device 2404. The induced current can be used by charging circuitry 2447 to charge battery 2446. Wireless charging device 2402 can further include a computing system 2421 coupled to a communication system 2422 and wireless charging circuitry 2423. Wireless charging circuitry can include circuit components to convert standard AC power having a first set of voltage and frequency characteristics (e.g., standard AC wall power) to AC power suitable for operating coil 2410. Suitable circuit components, including rectifiers (AC-to-DC converters), boost circuits (DC-to-DC voltage boosting circuits), inverters (DC-to-AC converters), and the like, are known in the art. Computing system 2421 can include logic circuitry (such as a microprocessor, microcontroller, FPGA, or the like) configured to control the operation of wireless charging device 2402, such as to control wireless charging circuitry 2423 to use power received from external power source 2450 to generate time-varying magnetic flux to induce current in coil 2410 to charge portable electronic device 2404. In some embodiments, computing system 2421 can implement functionality confirming to the Qi standard for wireless charging (promulgated by the Wireless Power Consortium).

In some embodiments, components implementing computing system 2421 and wireless charging circuitry 2423 can be disposed within the housing that holds coil 2412 and primary alignment component 2416. In other embodiments, some or all of the components implementing computing system 2421 and wireless charging circuitry 2423 can be disposed elsewhere. For example, the logic circuitry implementing computing system 2421 can be disposed within housing 302 while wireless charging circuitry 2432 is disposed in a boot of a plug connector at the distal end of cable 304. (In this case, cable 304 can provide AC power to wireless charging device 300.) As another example, the logic circuitry implementing computing system 2421 and circuit components implementing portions of wireless charging circuitry 2423 can be disposed within housing 302 while circuit components implementing other portions of wireless charging circuitry 2423 are disposed in a boot of a plug connector at the distal end of cable 304. For instance, an inverter may be disposed within housing 302 while a rectifier and boost circuit are disposed in the boot. (In this case, cable 304 can provide DC power to wireless charging device 300.)

As described above, accessory device 2406 can be a passive accessory such as protective case for portable electronic device 2904 and need not include any components other than auxiliary alignment component 2470. In some embodiments, accessory device 2406 can be an active device. For instance, accessory device 2406 can include a computing system 2461 coupled to a memory bank 2462 and a communication system 2463. Computing system 2461 can execute instructions stored in memory bank 2462 to perform one or more functions using communication system 2463. In some embodiments, computing system 2461 can be configured to send data from memory bank 2462 through communication system 2463 to portable electronic device 2404 regarding a user interface theme for portable electronic device 2404 so that portable electronic device 2404 can use this data to modify its user interface. As an example, accessory device 2406 can be a protective case that has a picture of a car on it, and memory bank 2462 has information stored for configuring a user interface to include a car theme with car-related icons, animations, and/or sounds. Thus, when accessory device 2406 is installed on portable electronic device 2404, computing system 2441 can receive the car-themed user interface from accessory device 2406 and can modify user interface system 2443 according to the received car-themed data (e.g., changing what is displayed, what sounds are played to signal events, etc.). In some embodiments, accessory device 2406 can also include a wireless charging component 2464 that can aid in wireless charging between portable electronic device 2404 and wireless charging device 2402. For instance, wireless charging component 2464 can include a block of magnetic material that can help guide magnetic flux through accessory device 2406. Or, wireless charging component 2464 can include a pair of inductor coils where one inductor coil positioned proximate to wireless charging device 2402 can receive magnetic flux, which can be relayed to the other inductor coil positioned proximate to portable electronic device 2404 so that the received flux can be retransmitted to portable electronic device 2404. In some embodiments, accessory device 2406 can include a battery (not shown) to store power received from wireless charging device 2402 at a first time for delivery to portable electronic device 2404 at a later time.

While system 2400 is described with reference to particular blocks, it is to be understood that these blocks are defined for convenience of description and are not intended to imply a particular physical arrangement of component parts. The blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices that use using any combination of circuitry and software to enable wireless charging operations and/or other operations where physical alignment between devices is desired.

For various applications, it may be desirable to enable a device having a magnetic alignment component to identify other devices that are brought into alignment. In some embodiments where the devices support a wireless charging standard that defines a communication protocol between devices, the devices can use that protocol to communicate. For example, the Qi standard for wireless power transfer defines a communication protocol that enables a power-receiving device (i.e., a device that has an inductive coil to receive power transferred wirelessly) to communicate information to a power-transmitting device (i.e., a device that has an inductive coil to generate time-varying magnetic fields to transfer power wirelessly to another device) via a modulation scheme in the inductive coils. The Qi communication protocol or similar protocols can be used to communicate information such as device identification or charging status or requests to increase or decrease power transfer from the power-receiving device to the power-transmitting device.

In some embodiments, a separate communication subsystem, such as a Near-Field Communication (NFC) subsystem can be provided to enable additional communication between devices. For example, each device that has an annular magnetic alignment component can also have an NFC coil that can be disposed inside and concentric with the annular magnetic alignment component. Where the device also has an inductive charging coil (which can be a transmitter coil or a receiver coil), the NFC coil can be disposed in a gap between the inductive charging coil and an annular magnetic alignment component. In some embodiments, the NFC coils can be used to allow a portable electronic device to identify other devices, such as a wireless charging device and/or an auxiliary device, when the respective magnetic alignment components of the devices are brought into alignment. For example, the NFC coil of a power-receiving device can be coupled to an NFC reader circuit while the NFC coil of a power-transmitting device or an accessory device is coupled to an NFC tag circuit. When devices are brought into proximity, the NFC reader circuit of the power-receiving device can be activated to read the NFC tag of the power-transmitting device and/or the accessory device. In this manner, the power-receiving device can obtain information (e.g., device identification) from the power-transmitting device and/or the accessory device.

In some embodiments, an NFC reader in a portable electronic device can be triggered by detecting a change in the DC (or static) magnetic field generated by the magnetic alignment component of the portable electronic device that corresponds to a change expected when another device with a complementary magnetic alignment component is brought into alignment. When the expected change is detected, the NFC reader can be activated to read an NFC tag in the other device, assuming the other device is present.

While the invention has been described with reference to specific embodiments, those skilled in the art will appreciate that variations and modifications are possible. For instance, although the annular alignment modules are described as being made from arcuate magnets that form sectors, it will be understood that if the magnets are sufficiently small relative to the dimensions of the annular structure, trapezoidal or square magnets can approximate the behavior of arcuate magnets. Magnetic alignment components can have any dimensions, and annular magnetic alignment components can be used with or without rotational magnetic alignment components and with or without NFC circuitry. Where NFC circuitry is present, a given device can have NFC reader circuitry or NFC tag circuitry (or both) in combination with any of a primary, secondary, or auxiliary annular magnetic alignment component, and a variety of NFC coil geometries can be implemented. Magnetic alignment components can be used with an inductive charging coil to facilitate alignment of the coils as described above, or a magnetic alignment component can be present in a device that does not have an inductive charging coil.

Further, while it is contemplated that magnetic alignment components of the kind described herein can be used to facilitate alignment between transmitter and receiver coils for wireless power transfer between devices, use of magnetic alignment components is not so limited, and magnetic alignment components can be used in a variety of contexts to hold one device in relative alignment with another, regardless of whether either or both devices have wireless charging coils. Thus, for instance, a tripod (or other type of stand), which can hold a portable electronic device in a particular positon and orientation, can include a primary annular magnetic alignment component (and a rotational magnetic alignment component) to hold the portable electronic device in place; the magnetic alignment component can be used in addition to or instead of mechanical retention features to secure the portable electronic device to the tripod.

Accordingly, ecosystems of devices are contemplated. The ecosystem can include a variety of portable electronic devices having various form factors, such as smart phones, tablets, or other devices that can operate on battery power and can receive power via wireless power transfer. The ecosystem can also include a variety of wireless charging devices such as pucks, mats, docks, and the like. The ecosystem can also include "charge-through" accessories (such as cases) that may be interposed between a portable electronic device and a wireless charging device; the charge-through accessory is designed to permit magnetic flux to pass through the interposed portion of the accessory to allow wireless charging while the accessory is present. In such an ecosystem, each portable electronic device can be manufactured to include a secondary annular magnetic alignment component (e.g., having a radial or transverse magnetic orientation as described above) having dimensions of radial width and outer diameter that are constant across the ecosystem. Each wireless charging device can be manufactured to include a primary annular magnetic alignment component complementary to the secondary annular magnetic alignment components of the portable electronic devices (e.g., having a quad-pole configuration as described above), allowing wireless charging devices to be used interchangeably with different portable electronic devices. Each charge-through accessory can be manufactured to include an auxiliary annular magnetic alignment component complementary to the primary and secondary annular magnetic alignment components, again allowing interchangeable use of wireless charging devices with different charge-through accessories (and portable electronic devices).

Such ecosystems can also include other accessory devices that may not be designed to support charge-through operation, such as tripods, cases that may hold credit cards or other magnetized items that may be susceptible to demagnetization during wireless power transfer, or other accessories that are intended for use with a portable electronic device that is not being charged. Such accessory devices can be manufactured to include either a secondary annular magnetic alignment component or an auxiliary annular magnetic alignment component.

Such ecosystems can also include "retrofitting" accessory device that may be used to provide magnetic alignment capability for a portable electronic device that was originally manufactured without a magnetic alignment component. A retrofitting accessory can have one or more mechanical retention features (e.g., sides and lips of a case shaped as a tray) that hold the smart phone (or other portable electronic device) in a fixed relative alignment with the housing of the accessory. The accessory can include a secondary magnetic alignment component (matching the specifications of the secondary alignment component for the ecosystem), and the secondary magnetic alignment component can be positioned in the retrofitting accessory so that when the portable electronic device is held in place by the mechanical retention feature(s), the inductive charging coil is centered within the secondary magnetic alignment component. Such an accessory can allow a portable electronic device that was manufactured without a magnetic alignment component to enjoy the benefits of magnetic alignment when used with devices in the magnetic alignment ecosystem.

It should be understood that, within a given ecosystem, any or all of the devices that include annular alignment components may also include rotational magnetic alignment components as described above. For instance, within an ecosystem, all portable electronic devices having a annular alignment component that are large enough to accommodate a rotational magnetic alignment component outside the annular alignment component can have a rotational magnetic alignment component. Devices having a primary alignment component or auxiliary alignment component might or might not have a rotational magnetic alignment component, depending on form factor and intended use.

It should also be understood that, within a given ecosystem, any or all of the devices that include annular alignment components may also include NFC circuitry for device identification as described above. For instance, within an ecosystem, any portable electronic device can have an NFC reader circuit as described above, while any device having a primary annular alignment component or auxiliary annular alignment component can have an NFC tag circuit as described above.

It should also be understood that some devices may include multiple annular alignment components. For instance, a wireless charging device may be designed with two or more separate wireless charging coils spaced apart from each other to allow multiple portable electronic devices to be charged at the same time. Each wireless charging coil can have a surrounding primary annular alignment component, and each primary alignment component can have an associated rotational magnetic alignment component and/or NFC coil.

In some embodiments, an alignment module that includes an annular alignment component can be packaged for easy installation into an accessory device, wireless charging device, or portable electronic device. For example, an alignment module can include a primary, secondary, or auxiliary annular magnetic alignment component as described above in an enclosing structure (or housing) that protects the magnets and holds them in position In some embodiments, a rotational magnetic alignment component can be included along with the annular magnetic alignment component, and in some embodiments, an NFC circuit can be included. The enclosing structure can be, for instance, a plastic structure, at least part of which can be transparent. As another example, the alignment module can include a wireless charging coil (e.g., a transmitter coil) centered within the annular alignment component. The enclosing structure can provide exposed electrical contacts for making electrical connections to the wireless charging coil. Such alignment modules can be made by one entity and sold to a different entity to incorporate into devices such as cases, wireless charging docks, or the like.

Accordingly, although the invention has been described with respect to specific embodiments, it will be appreciated that the invention is intended to cover all modifications and equivalents within the scope of the following claims.

Various examples of aspects of the disclosure are described below as clauses for convenience. These are provided as examples, and do not limit the subject technology.

Clause A: a case for a portable electronic device, the case comprising: a body defining an annular cavity; an assembly within the annular cavity, the assembly comprising: a top layer; a bottom layer; an annular magnetic alignment component between the top layer and the bottom layer; and a near-field communication (NFC) coil coaxial with the annular magnetic alignment component and between the top layer and the bottom layer; and an adhesive securing the assembly to inner walls of the annular cavity.

Clause B: a case for a portable electronic device, the case comprising: an back layer comprising an at least partially translucent material of a color; a body above the back layer, the body comprising an at least partially translucent material and defining an annular cavity extending from an annular opening on a side of the body that is opposite the back layer; an assembly within the annular cavity, the assembly comprising: one or more magnetic components; and a bottom layer between the one or more magnetic components and the back layer, the bottom layer comprising an opaque material of a color that matches the color of the back layer; and an adhesive securing the assembly to inner walls of the annular cavity.

Clause C: a method for assembling a case for a portable electronic device, the method comprising: forming an annular cavity within a body; providing an adhesive in a liquid state into the annular cavity; inserting an assembly into the annular cavity, the assembly comprising: a top layer; a bottom layer; an annular magnetic alignment component between the top layer and the bottom layer; and a near-field communication (NFC) coil coaxial with the annular magnetic alignment component and between the top layer and the bottom layer, wherein the bottom layer displaces a portion of the adhesive while the assembly is inserted into the annular cavity.

One or more of the above clauses can include one or more of the features described below. It is noted that any of the following clauses may be combined in any combination with each other, and placed into a respective independent clause, e.g., clause A, B, or C.

Clause 1: the annular cavity extends from an opening on a surface of the body; and the top layer is flush with the surface of body.

Clause 2: the NFC coil configured to wirelessly exchange data signals with another device through the top layer.

Clause 3: the annular magnetic alignment component including a plurality of sectors, each sector having a magnetic orientation with a radial component.

Clause 4: the body further defines an additional cavity disposed outside a perimeter of the annular cavity; the case further comprises a rotational magnetic alignment component within the additional cavity and comprising a magnet.

Clause 5: the assembly further comprises a shim between the NFC coil and the bottom layer.

Clause 6: the assembly further comprises electronic components operatively connected to the NFC coil, the electronic components disposed within openings extending through the shim.

Clause 7: the electronic components are disposed within a gap separating magnets of the annular magnetic alignment component.

Clause 8: the electronic components comprise a capacitor in series with the NFC coil.

Clause 9: the body comprises: a first portion adjacent to the annular cavity, the first portion having a first thickness; and a second portion around the first portion, the second portion having a second thickness that is less than the first thickness.

Clause 10: the body comprises an at least partially translucent material.

Clause 11: the one or more magnetic components comprises: an annular magnetic alignment component; and a near-field communication (NFC) coil coaxial with the annular magnetic alignment component.

Clause 12: the at least partially translucent material of the back layer comprises silicone; and the at least partially translucent material of the body comprises polycarbonate.

Clause 13: the color is a first color; the case further comprises an front layer comprising an at least partially translucent material of a second color; and the assembly further comprises a top layer comprising an opaque material of a color that matches the second color of the front layer.

Clause 14: the at least partially translucent material of the front layer comprises microfiber.

Clause 15: providing a mask on a surface of the body, wherein forming the annular cavity comprises penetrating the mask and the annular cavity, wherein the assembly further comprises: an annular liner over the top layer; and an assembly liner over the annular liner, wherein a portion of the adhesive that is displayed by the bottom layer moves over the mask and under the assembly liner; removing the assembly liner; removing the annular liner; removing the mask; removing a portion of the adhesive that is displayed by the bottom layer.

Clause 16: a thickness of the annular liner is substantially equal to a thickness of the mask, and the top layer is flush with the surface of the body.

Clause 17: after removing the assembly liner and before removing the annular liner and removing the mask, allowing the adhesive to cure.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary housing of reference, rather than to the ordinary gravitational housing of reference. Thus, such a term may extend upwardly, downwardly, diagonally, or horizontally in a gravitational housing of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A case for a portable electronic device, the case comprising:
   a body defining an annular cavity defined by a round outer wall facing radially inwardly and a round inner wall facing radially outwardly towards the round outer wall;
   an assembly within the annular cavity, the assembly comprising:
      a top layer;
      a bottom layer;
      an annular magnetic alignment component between the top layer and the bottom layer; and
      a near-field communication (NFC) coil coaxial with the annular magnetic alignment component and between the top layer and the bottom layer; and
   an adhesive securing the assembly to inner walls of the annular cavity.

2. The case of claim 1, wherein:
   the annular cavity extends from an opening on a surface of the body; and
   the top layer is flush with the surface of the body.

3. The case of claim 1, wherein the NFC coil configured to wirelessly exchange data signals with another device through the top layer.

4. The case of claim 1, wherein the annular magnetic alignment component including a plurality of sectors, each sector having a magnetic orientation with a radial component.

5. The case of claim 1, wherein:
   the body further defines an additional cavity disposed outside a perimeter of the annular cavity;
   the case further comprises a rotational magnetic alignment component within the additional cavity and comprising a magnet.

6. The case of claim 1, wherein the assembly further comprises a shim between the NFC coil and the bottom layer.

7. The case of claim 6, wherein the assembly further comprises electronic components operatively connected to the NFC coil, the electronic components disposed within openings extending through the shim.

8. The case of claim 7, wherein the electronic components are disposed within a gap separating magnets of the annular magnetic alignment component.

9. The case of claim 7, wherein the electronic components comprise a capacitor in series with the NFC coil.

10. The case of claim 1, wherein the body comprises:
    a first portion adjacent to the annular cavity, the first portion having a first thickness; and
    a second portion around the first portion, the second portion having a second thickness that is less than the first thickness.

11. A case for a portable electronic device, the case comprising:
    a back layer comprising an at least partially translucent material of a color;
    a body above the back layer, the body comprising an at least partially translucent material and defining an annular cavity extending from an annular opening on a side of the body that is opposite the back layer, the annular cavity being defined by a round outer wall facing radially inwardly and a round inner wall facing radially outwardly towards the round outer wall;
    an assembly within the annular cavity, the assembly comprising:
       one or more permanent magnets; and
       a bottom layer between the one or more permanent magnets and the back layer, the bottom layer comprising an opaque material of a color that matches the color of the back layer; and
    an adhesive securing the assembly to inner walls of the annular cavity.

12. The case of claim 11, wherein the one or more permanent magnets comprises:
    an annular magnetic alignment component; and
    a near-field communication (NFC) coil coaxial with the annular magnetic alignment component.

13. The case of claim 11, wherein:
    the at least partially translucent material of the back layer comprises silicone; and
    the at least partially translucent material of the body comprises polycarbonate.

14. The case of claim 11, wherein:
    the color is a first color;
    the case further comprises a front layer comprising an additional at least partially translucent material of a second color; and
    the assembly further comprises a top layer comprising an additional opaque material of a color that matches the second color of the front layer.

15. The case of claim 14, wherein the at least partially translucent material of the front layer comprises microfiber.

16. A method for assembling a case for a portable electronic device, the method comprising:
    forming an annular cavity within a body, the annular cavity being defined by a round outer wall facing radially inwardly and a round inner wall facing radially outwardly towards the round outer wall;
    providing an adhesive in a liquid state into the annular cavity;
    inserting an assembly into the annular cavity, the assembly comprising:
       a top layer;
       a bottom layer;
       an annular magnetic alignment component between the top layer and the bottom layer; and
       a near-field communication (NFC) coil coaxial with the annular magnetic alignment component and between the top layer and the bottom layer, wherein the bottom layer displaces a portion of the adhesive while the assembly is inserted into the annular cavity.

17. The method of claim 16, further comprising:
providing a mask on a surface of the body, wherein forming the annular cavity comprises penetrating the mask and the annular cavity, wherein the assembly further comprises:
an annular liner over the top layer; and
an assembly liner over the annular liner, wherein a portion of the adhesive that is displaced by the bottom layer moves over the mask and under the assembly liner;
removing the assembly liner;
removing the annular liner;
removing the mask;
removing a portion of the adhesive that is displaced by the bottom layer.

18. The method of claim 17, wherein a thickness of the annular liner is substantially equal to a thickness of the mask, and the top layer is flush with the surface of the body.

19. The method of claim 17, further comprising, after removing the assembly liner and before removing the annular liner and removing the mask, allowing the adhesive to cure.

* * * * *